(12) United States Patent
Daboul et al.

(10) Patent No.: US 11,873,799 B2
(45) Date of Patent: Jan. 16, 2024

(54) AIR COOLING DEVICE, GENERATOR, AIR GUIDING DEVICE, WIND POWER INSTALLATION AND METHOD FOR PRODUCING A GENERATOR AND A WIND POWER INSTALLATION

(71) Applicant: Wobben Properties GmbH, Aurich (DE)

(72) Inventors: Hussam Daboul, Südbrookmerland (DE); Wojciech Giengiel, Aurich (DE); Jochen Stemberg, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/698,469

(22) Filed: Mar. 18, 2022

(65) Prior Publication Data

US 2022/0307483 A1 Sep. 29, 2022

(30) Foreign Application Priority Data

Mar. 29, 2021 (DE) .......................... 102021107905.5

(51) Int. Cl.
*F03D 80/60* (2016.01)
*F03D 9/25* (2016.01)

(52) U.S. Cl.
CPC .............. *F03D 80/60* (2016.05); *F03D 9/25* (2016.05); *F05B 2260/205* (2013.01); *F05B 2260/2241* (2013.01)

(58) Field of Classification Search
CPC ...... F03D 80/60; F03D 9/25; F05B 2260/205; F05B 2260/2241
See application file for complete search history.

(56) References Cited

U.S. PATENT DOCUMENTS

| 8,047,774 B2 | 11/2011 | Bagepalli | |
|---|---|---|---|
| 2001/0035651 A1* | 11/2001 | Umemoto | F03D 80/60 416/41 |
| 2007/0222223 A1* | 9/2007 | Bagepalli | H02K 9/02 290/55 |
| 2015/0211490 A1* | 7/2015 | Airoldi | F03D 80/60 290/1 B |
| 2015/0233265 A1 | 8/2015 | Rohden | |

FOREIGN PATENT DOCUMENTS

| CN | 104956075 A | 9/2015 |
|---|---|---|
| DE | 10351844 A1 | 6/2005 |
| DE | 102007042338 A1 | 3/2009 |
| EP | 2546595 A1 | 1/2013 |
| EP | 2902619 A1 | 8/2015 |
| WO | WO 2013104777 A2 | 7/2013 |

\* cited by examiner

*Primary Examiner* — Sean Gugger
(74) *Attorney, Agent, or Firm* — Seed IP Law Group

(57) ABSTRACT

Air cooling device for the air cooling of a generator of a wind power installation by means of wind, comprising a cooling unit of the generator with a cooling unit outer surface, the wind flowing onto said cooling unit outer surface for the air cooling of the generator during the operation of the wind power installation, wherein an air deflector is arranged on the cooling unit outer surface of the cooling unit and has a first air deflection unit which extends outwardly at an acute angle starting from the cooling unit outer surface and forms with the cooling unit a converging first air deflection channel, which is configured in an operating state of the wind power installation to deflect the wind for the air cooling in the direction of the cooling unit.

17 Claims, 14 Drawing Sheets

AIR COOLING DEVICE, GENERATOR, AIR GUIDING DEVICE, WIND POWER INSTALLATION AND METHOD FOR PRODUCING A GENERATOR AND A WIND POWER INSTALLATION

BACKGROUND

Technical Field

The invention relates to an air cooling device for the air cooling of a generator of a wind power installation by means of wind. The invention further relates to a generator of a wind power installation.

The invention further relates to an air guiding device for providing wind for the air cooling to a cooling unit of a generator of a wind power installation. The invention further relates to a wind power installation.

The invention finally relates to a method for producing a generator of a wind power installation having an air cooling device and a method for producing a wind power installation.

Description of the Related Art

Wind power installations are known. A current conventional type of wind power installation is a so-called horizontal axis wind power installation, generally having three rotor blades. Such wind power installations increasingly have a larger structural shape, namely in particular higher hub or axle heights and larger rotor diameters with a correspondingly larger generator and greater feed-in power. Larger generators require greater cooling power in order to operate the generator at an optimal operating temperature.

It is known to cool generators of wind power installations by an active cooling unit by means of a cooling medium, for example air or coolant. To this end, active cooling units generate a cooling medium flow, for example an airflow, which is guided along the surfaces of the generator to be cooled. Such an airflow is generated, for example, by a fan. Alternatively, for cooling a generator, coolant may be guided through pipes which remove the heat. Generators may be operated at an optimal operating temperature using such active cooling units. However, wind power installations having such active cooling units are expensive, on the one hand in terms of production, and on the other hand during operation, in particular regarding servicing and maintenance operations.

It is also known to cool generators of wind power installations passively by wind, i.e., an airflow. To this end, it is provided that wind flows onto a cooling unit of the generator, the wind also being used by the wind power installations for generating the power. However, generators of a conventional wind power installation are only able to be passively cooled by wind to an insufficient degree. Generally, the wind is not sufficient for operating generators at an optimal operating temperature.

The German Patent and Trademark Office has researched the following prior art in the priority application relative to the present application: DE 103 51 844 A1, DE 10 2007 042 338 A1, U.S. Pat. No. 8,047,774 B2, EP 2 546 595 A1, CN 104956075 A.

BRIEF SUMMARY

Provided is an air cooling device for the air cooling of a generator of a wind power installation by means of wind, comprising a cooling unit of the generator with a cooling unit outer surface, the wind flowing onto said cooling unit outer surface for the air cooling of the generator during the operation of the wind power installation. Provided is a generator of a wind power installation.

Provided is an air guiding device for providing wind for the air cooling to a cooling unit of a generator of a wind power installation, comprising a rotational unit of an aerodynamic rotor of the wind power installation having a rotational unit outer surface, the wind flowing along said rotational unit outer surface during the operation of the wind power installation, wherein the rotational unit has connections for fastening and/or through-openings for passing through rotor blades of the aerodynamic rotor.

Provided is an air cooling device, a generator, an air guiding device, a wind power installation and a method for producing a generator as well as a wind power installation which remedies the aforementioned problems. In particular, provided is an air cooling device, a generator, an air guiding device, a wind power installation and a method for producing a generator, as well as a wind power installation which permits an operation of a generator of a wind power installation at an optimal operating temperature. Provided is an air cooling device, a generator, an air guiding device, a wind power installation and a method for producing a generator, as well as a wind power installation which permits a more cost-effective production and a more cost-effective operation of a wind power installation.

According to one aspect provided is an air cooling device for the air cooling of a generator of a wind power installation by means of wind, comprising an air deflector which is arranged on the cooling unit and extends outwardly in a radial direction starting from the cooling unit outer surface and in an operating state of the wind power installation is configured to deflect the wind for the air cooling in the radial direction inwardly in the direction of the cooling unit.

The wind which flows onto and around the wind power installation may be deflected by an air deflector in the direction of the cooling unit of a generator. The air deflector has the effect of accelerating the wind which thus flows at a greater speed along the cooling unit and achieves an improved cooling action. Moreover, the effect of the air deflector, in particular, is that the wind is diverted in a radial direction which deflects the wind into an interior of the cooling unit. As a result, a generator may be operated at an optimal operating temperature, but in any case closer to the optimal operating temperature. In particular, the cooling unit, i.e., the generator, may be evenly cooled by the air deflector. This leads to a small temperature gradient, in particular in the axial direction and peripheral direction, which in turn increases the efficiency of a generator. Moreover, such passive cooling has the advantage that the energy consumption for active cooling is minimized or even entirely avoided, which in turn saves costs.

In the operating state, the wind power installation extends from a foundation with a tower as far as a nacelle on which the aerodynamic rotor is arranged with the rotor blades. In the operating state, the wind power installation or the tower extend in a substantially vertical direction. In this regard, the foundation forms a lower end of the wind power installation and the nacelle forms an upper end with the aerodynamic rotor. The generator which is coupled to the aerodynamic rotor is arranged inside the nacelle.

In the operating state of the wind power installation, the nacelle may be rotatably mounted about a nacelle axis. The nacelle axis is generally aligned substantially vertically. Due to the rotatable mounting of the nacelle about the nacelle axis, the aerodynamic rotor of the wind power installation may be aligned according to the wind direction. The generator which is arranged in the nacelle has a stator with a rotational axis, about which a rotor of the generator is rotatably mounted relative to the stator of the generator in order to generate electrical energy from kinetic energy. In a preferred embodiment, the generator is configured as a high-pole, in particular separately excited, synchronous generator. In the operating state of the wind power installation, the rotational axis is preferably aligned substantially at right angles to the nacelle axis. In particular, the rotational axis is aligned so as to be slightly inclined relative to the nacelle axis.

In the operating state of the wind power installation, the cooling unit is preferably arranged on the generator. In particular, in the operating state of the wind power installation the cooling unit is arranged on an outer surface of the generator. Moreover, it may be preferred that in the operating state of the wind power installation the cooling unit is fastened to the nacelle. It is preferred in any case that in the operating state of the wind power installation the cooling unit is thermally coupled to the generator.

In the present text, positional and location information such as for example "top" and "bottom" or "outer" and "inner" or "radially," "axially" or "periphery," unless indicated otherwise, refer to the operating state of a wind power installation, in particular to the rotational axis of the generator. In particular, it is to be understood that an axial direction substantially corresponds to an alignment or orientation of the rotational axis of the generator.

During the transportation and/or during maintenance and/or servicing operations on the wind power installation and/or the generator and/or the air cooling device and/or tower, the alignment of the axes may deviate, in particular relative to one another, from the alignment of the axes in the operating state of the wind power installation.

The cooling unit extends with a cooling unit length between a first and second end in the axial direction. The axial direction preferably corresponds to an orientation of the rotational axis of the generator. The cooling unit extends, in particular, with a cooling unit width between a first and second side in the peripheral direction, at right angles to the axial direction. The cooling unit extends with a cooling unit height at right angles to the axial direction and peripheral direction between a cooling unit inner surface and the cooling unit outer surface.

Preferably, the cooling unit height is smaller than the cooling unit width. Moreover, it is preferred that the cooling unit width is smaller than the cooling unit length. Preferably, the cooling unit is configured as a partial ring segment. It may also be preferred that the cooling unit comprises one or more partial ring cooling segments.

The cooling unit outer surface is preferably of planar configuration. It may also be preferred that the cooling unit outer surface is configured to be profiled. In particular, the cooling unit outer surface may have raised portions or extensions which extend outwardly in the radial direction and/or may have recesses which extend inwardly in the radial direction. In particular, the cooling unit outer surface may have a rib-shaped and/or wave-shaped and/or tubular profile and/or channel-shaped profile.

In the operating state, the cooling unit is arranged on an outer face of the generator. For cooling the generator, said generator is thermally coupled to the cooling unit. Preferably, the nacelle forms the cooling unit or receives this cooling unit on the outer face. In particular, it is provided that the nacelle has one or more openings in which the cooling unit is arranged. The one or more openings may be configured to be annular or partially annular.

In particular, an outer face of a stator and/or a generator may form or may be the cooling unit.

In the operating state of the wind power installation the air deflector is configured to deflect the wind for the air cooling in the radial direction inwardly in the direction of the cooling unit. To this end, the air deflector is preferably arranged so as to be inclined relative to the cooling unit outer surface. In particular, the air deflector is arranged such that said air deflector and said cooling unit surface form one or more air deflection channels which deflect the wind for the air cooling in the radial direction inwardly in the direction of the cooling unit. In particular, in the operating state of the wind power installation the one or more air deflection channels are aligned toward the wind direction, so that the wind which flows around the wind power installation enters the one or more air deflection channels.

It may be preferred that the air deflector is arranged spaced apart from the cooling unit, said air deflector extending outwardly in the radial direction starting from the cooling unit outer surface. In particular, the air deflector may be arranged spaced apart from the cooling unit in the radial direction. In particular, the air deflector has a spacing in the radial direction which corresponds at least to 0%, 1%, 5%, 10%, 20%, 30%, 40%, 50%, 100%, 150% or 200% of the cooling unit length and/or a maximum of 0%, 1%, 5%, 10%, 20%, 30%, 40%, 50%, 100%, 150% or 200% of the cooling unit length.

Alternatively, it may be preferred that the cooling unit integrally forms the air deflector. In particular, it is also preferred that the air deflector is fastened to the cooling unit outer surface. Preferably, the air deflector is connected by a non-positive and/or material and/or positive connection to the cooling unit. In particular, it may be preferred that the air deflector is welded to the cooling unit. Alternatively or additionally, it may be preferred to screw the air deflector to the cooling unit.

According to a preferred embodiment of the air cooling device, it is provided that the air deflector has a first air deflection unit which extends outwardly at an acute angle in the radial direction starting from the cooling unit outer surface and/or forms with the cooling unit a converging first air deflection channel, which is configured in the operating state of the wind power installation to deflect the wind for the air cooling in the radial direction inwardly in the direction of the cooling unit. Alternatively or additionally, it is preferably provided that the cooling unit has a plurality of cooling ribs which have a main extension in an axial direction and which are arranged spaced apart in a peripheral direction at right angles to the axial direction, and the air deflector has a main extension substantially in the peripheral direction.

The first air deflection unit is arranged on the cooling unit outer surface such that said first air deflection unit extends outwardly at an acute angle or in an acute-angled manner in the radial direction. An acute angle is located between at least including 0° and a maximum including 90°. In particular, the effect of the acute-angled arrangement of the first air deflection unit is that in the operating state of the wind power installation the wind flowing substantially axially thereon is diverted in the radial direction inwardly in the direction of the cooling unit.

The first air deflection unit is preferably configured to be partially annular or annular. The first air deflection unit extends in the axial direction with a first length, in the peripheral direction with a first width and in the radial direction with a first height. Preferably, the first width is larger than the first length and/or the first height. Preferably, the first air deflection unit has a linear profile. A linear profile has, in particular, no curvature. It may be preferred that the first air deflection unit has a curved profile and/or a profile with edges. Preferably, the edge of the profile of the first air deflection unit has an edge length which preferably corresponds at least to 0% and to a maximum of 200% of the cooling unit length which extends between the first end and second end. In particular, the profile of the first air deflection unit may also be configured to be S-shaped. In particular, the profile of the first air deflection unit may have convex and/or concave profile portions.

The acute-angled arrangement of the first air deflection unit on the cooling unit outer surface has the advantage of deflecting the wind, which flows around the wind power installation in the operating state thereof, in a particularly efficient manner in the direction of the radially internal cooling unit. In particular, the wind may be provided on the cooling unit in a sufficient quantity and at a suitable speed for the cooling.

The first air deflection unit is arranged on the cooling unit such that it forms with the cooling unit outer surface a first air deflection channel which converges. The air deflection channel has an inlet opening through which the wind enters in the operating state of the wind power installation, and an outlet opening through which the wind exits in the operating state of the wind power installation. In the case of a converging air deflection channel, the cross section of the channel reduces in the flow direction. In the case of a converging air deflection channel, the inlet opening may be smaller than the outlet opening. In particular, the first air deflection channel converges in the axial direction. In this preferred embodiment, the first converging air deflection channel is of annular configuration. However, it may also be preferred to configure the first converging air deflection channel to be tubular. In the present embodiment, the first converging air deflection channel has a cross section which is constant in the peripheral direction.

Such a converging air deflection channel has the advantage that the wind is accelerated in the direction of the cooling unit, which further improves the cooling power of the air cooling device.

The cooling unit has a plurality of cooling ribs which are arranged spaced apart from one another in the peripheral direction. The cooling ribs which are respectively arranged adjacently to one another define in the peripheral direction, in particular, a ventilation channel which has a main extension in the axial direction. The air supplied by the first air deflection unit may flow in the ventilation channels for cooling the generator or the cooling unit.

The effect of the cooling unit which is configured with cooling ribs is that the surface, via which the heat of the generator may be discharged, is increased. Moreover, the effect of the cooling ribs is that they deflect the wind supplied thereto in the axial direction over the cooling unit length for improved cooling action. In particular, the cooling ribs which are arranged spaced apart in the peripheral direction define ventilation channels which may further accelerate the supplied wind and further improve the cooling power of the air cooling device.

According to a further preferred development, the air guiding device comprises a second and/or third air deflection unit.

The second air deflection unit is arranged offset in the axial direction relative to the first air deflection unit and extends outwardly at an acute angle in the radial direction starting from the cooling unit outer surface and/or forms with the cooling unit a converging second air deflection channel which in the operating state of the wind power installation is configured to deflect the wind for the air cooling in the radial direction inwardly in the direction of the cooling unit.

The third air deflection unit is arranged offset in the axial direction relative to the first and/or second air deflection unit and extends outwardly at an acute angle in the radial direction starting from the cooling unit outer surface and/or forms with the cooling unit a converging third air deflection channel which in the operating state of the wind power installation is configured to deflect the wind for the air cooling in the radial direction inwardly in the direction of the cooling unit.

The second and/or third air deflection units are arranged on the cooling unit outer surface such that they extend outwardly at an acute angle or in an acute-angled manner in the radial direction. In particular, the effect of the acute angled arrangement of the second and/or third air deflection unit is that in the operating state of the wind power installation the wind flowing substantially axially thereon is deflected inwardly in the direction of the cooling unit.

The second and/or third air deflection units are preferably configured to be partially annular or annular. The second and/or third air deflection units extend in the axial direction with a second and/or third length, in the peripheral direction with a second and/or third width and in the radial direction with a second and/or third height. Preferably, the second and/or third width is larger than the second and/or third length and/or the second or third height. Preferably, the second and/or third air deflection unit has a linear profile. It may be preferred that the second and/or third air deflection unit has a curved profile and/or a profile with edges. Preferably, the edge of the profile of the second and/or third air deflection unit has an edge length which preferably corresponds at least to 0% and to a maximum of 200% of the cooling unit length which extends between the first end and the second end. In particular, the profile of the second and/or third air deflection unit may also be configured to be S-shaped. In particular, the profile of the second and/or third air deflection unit may have convex and/or concave profile portions.

The acute-angled arrangement of the second and/or third air deflection unit on the cooling unit outer surface has the advantage of deflecting the wind, which flows around the wind power installation in the operating state thereof, in a particularly efficient manner in the direction of the radially internal cooling unit. In particular, wind may be provided on the cooling unit in a sufficient quantity and at a suitable speed for the cooling.

The second and/or third air deflection unit is arranged on the cooling unit such that this second and/or third air deflection unit forms with the cooling unit outer surface a second and/or third air deflection channel which in each case converges. The air deflection channel has an inlet opening through which the wind enters in the operating state of the wind power installation and an outlet opening through which the wind exits in the operating state of the wind power installation. In particular, the second and/or third air deflection channel converges in the axial direction. In this preferred embodiment, the second and/or third converging air deflection channel is configured to be annular. However, it may also be preferred to configure the second and/or third converging air deflection channel to be tubular. In the present embodiment, the second and/or third converging air deflection channel has a cross section which is constant in the peripheral direction.

Such converging air deflection channels have the advantage that the wind is accelerated in the direction of the cooling unit, which further improves the cooling power of the air cooling device.

The first air deflection unit is arranged so as to be offset relative to the second and/or third air deflection unit. Preferably, the third air deflection unit is arranged between the first and second air deflection units. In particular, the first air deflection unit is arranged so as to be spaced apart relative to the second and/or third air deflection unit with a spacing of at least 0%, 10%, 20%, 30%, 40%, 50%, 100%, 200%, 300%, 400%, 500% or 1000% of the first length of the first air deflection unit. Additionally or alternatively, the first air deflection unit is arranged so as to be spaced apart relative to the second and/or third air deflection unit with a spacing of a maximum of 0%, 10%, 20%, 30%, 40%, 50%, 100%, 200%, 300%, 400%, 500% or 1000% of the first length of the first air deflection unit.

Preferably, the first air deflection unit is arranged spaced apart from the first end. It may be preferred that the first air deflection unit is arranged on the first end. Preferably, the first air deflection unit is arranged so as to be spaced apart from the first end of the cooling unit with a spacing of at least 0%, 10%, 20%, 30%, 40%, 50% or 60% of the cooling unit length. Additionally or alternatively, the first air deflection unit is arranged so as to be spaced apart from the first end of the cooling unit with a spacing of a maximum of 0%, 10%, 20%, 30%, 40%, 50% or 60% of the cooling unit length.

It may also be preferred that the second air deflection unit is arranged spaced apart from the second end.

An air deflector having a plurality of air deflection units has the advantage that the air deflection units may be arranged according to the incident flow profile of the wind on the cooling unit. The incident flow profile may depend on the type of wind power installation. Moreover, as a result, the quantity of wind which may be supplied to the cooling unit may be increased. This increases the cooling power and permits an operation of the wind power installation at an optimal operating temperature. Moreover, such an arrangement has the advantage that the cooling unit and thus the generator are cooled evenly in the peripheral direction and axial direction. In particular, a temperature gradient in the axial direction and/or peripheral direction on the cooling unit or the generator may be minimized by the arrangement.

According to a further preferred development of the air cooling device, it is provided that the first and/or second and/or third air deflection units are configured from one or more partial ring segments.

This preferred embodiment has the advantage that the air cooling device may be assembled in a particularly simple and cost-effective manner. As a result, in particular, in spite of the existing transport-relevant size limitations, air cooling devices for generators having a particularly large diameter may be provided and passively cooled.

Moreover, according to a preferred embodiment it is provided that starting from the cooling unit outer surface the first air deflection unit extends at a first acute angle, the second air deflection unit extends at second acute angle and the third air deflection unit extends at a third acute angle, wherein the first and/or second and/or third acute angle are equal and/or the first acute angle is smaller than the second and/or third acute angle, and/or the first acute angle is larger than the second and/or third acute angle, and/or starting from the cooling unit outer surface the first air deflection unit extends in the radial direction with a first height, the second air deflection unit extends in the radial direction with a second height and the third air deflection unit extends in the radial direction with a third height, wherein the first and/or second and/or third height are equal and/or the first height is smaller than the second and/or third height, and/or starting from the cooling unit outer surface the first air deflection unit extends in the axial direction with a first length, the second air deflection unit extends in the axial direction with a second length and the third air deflection unit extends in the axial direction with a third length, wherein the first and/or second and/or third length are equal, and/or the first length is smaller than the second and/or third length and/or the first length is larger than the second and/or third length.

The first and/or second and/or third acute angle correspond at least to 0°, 10°, 15°, 20°, 25°, 30°, 35°, 40°, 45°, 50°, 60°, 70°, 80°, 90° or more and to a maximum of 0°, 10°, 15°, 20°, 25°, 30°, 35°, 40°, 45°, 50°, 60°, 70°, 80° or 90°. Preferably, the first acute angle is smaller than the second and/or third acute angle. Moreover, it is preferred that the third acute angle is smaller than the second acute angle. In particular, it is preferred that the first acute angle is 20° or 30°. Moreover, it is preferred that the second and/or third acute angle is 30° or 35°. Moreover, it may be preferred that the first acute angle is larger than the second and/or third acute angle. Moreover, it may also be preferred that the third acute angle is larger than the second acute angle. It may also be preferred that the first and/or second and/or third acute angle are equal.

In particular, it is to be understood that, starting from the cooling unit outer surface, the first air deflection unit and/or the second air deflection unit and/or the third air deflection unit extends at an acute angle, so that wind is deflected between the cooling unit outer surface and the first air deflection unit and/or the second air deflection unit and/or the third air deflection unit. In particular, starting from the cooling unit outer surface, the first air deflection unit and/or the second air deflection unit and/or the third air deflection unit opens at an acute angle in the direction of the incident wind. In particular, it is to be understood that formed between the cooling unit outer surface and the first air deflection unit and/or the second air deflection unit and/or the third air deflection unit is a first and/or second and/or third obtuse angle which in the operating state faces away from the incident flow direction of the wind. In particular, the first acute angle and the first obtuse angle together form 180° and/or the second acute angle and the second obtuse angle together form 180° and/or the third acute angle and the third obtuse angle together form 180°. The first and/or the second and/or the third obtuse angles are larger than 90° and smaller than 180°.

The first and/or second and/or third height correspond at least to 0 mm, 50 mm, 100 mm, 150 mm, 200 mm, 300 mm or more and to a maximum of 0 mm, 50 mm, 100 mm, 150 mm, 200 mm or 300 mm. Preferably, the first height is smaller than the second and/or third height. It is also preferred that the third height is smaller than the second height.

The first and/or second and/or third length correspond at least to 0 mm, 50 mm, 100 mm, 150 mm, 200 mm, 300 mm or more and to a maximum of 0 mm, 50 mm, 100 mm, 150 mm, 200 mm, 300 mm. Preferably, the first length is smaller than the second and/or third length. Moreover, it is preferred that the third length is smaller than the second length. In particular, it is preferred that the first length is 150 mm. Moreover, it is preferred that the second and/or third length is 200 mm. Moreover, it is preferred that the first and/or second and/or third length correspond at least to 1%, 10%, 20%, 30%, 40% or 50% of the cooling unit length and/or to a maximum of 1%, 10%, 20%, 30%, 40% or 50% of the cooling unit length.

According to a further preferred development of the air cooling device, it is provided that the cooling unit extends in the axial direction between a first end, which in the operating state of the wind power installation is arranged upstream relative to the wind direction of the wind, and a second end which in the operating state of the wind power installation is arranged upstream of the first end relative to the wind direction of the wind, wherein the first air deflection unit is arranged in a first third and/or a first half of the cooling unit relative to the extension of the cooling unit starting from the first end in the axial direction, and/or the second air deflection unit is arranged in a second or third third relative to the extension of the cooling unit starting from the first end in the axial direction and/or a second half of the cooling unit and/or the third air deflection unit is arranged in a first, second or third third and/or a first or second half of the cooling unit relative to the extension of the cooling unit starting from the first end in the axial direction.

This embodiment has the advantage that a temperature gradient of the cooling unit or the generator to be cooled may be minimized in the axial direction and peripheral direction. This particularly preferably leads to an improved efficiency of the generator.

In a further preferred embodiment of the air cooling device, it is provided that the first and/or second and/or third air deflection unit in each case have a base element which is configured for arranging the respective air deflection unit on the cooling unit and/or an air deflection element which extends at an acute angle starting from the base element and forms with the cooling unit a converging air deflection channel which is configured in the operating state of the wind power installation to deflect the wind for the air cooling in the direction of the cooling unit, and/or a flange which extends at an angle starting from the base element and which is configured for connecting air deflection units arranged adjacently in the peripheral direction.

Such a preferred embodiment permits a particularly simple and cost-effective assembly of the air guiding device on the cooling unit. In particular, this preferred embodiment has the advantage that generators which are existing and already in operation may be retrofitted with such an air cooling device in a simple and cost-effective manner. Moreover, this has the effect that the generator may be assembled both in the factory and at the installation point of the wind power installation.

According to a further preferred embodiment, the air cooling device has a damping unit which is arranged between the air deflector and the cooling unit.

Moreover, according to a preferred development it is provided that in the operating state the air deflector extends in the axial direction between an air deflection leading edge and an air introduction edge, wherein the air deflection leading edge is arranged upstream relative to the air introduction edge relative to the wind. In the operating state, in the flow direction the wind firstly comes into contact with the air deflector on the air deflection leading edge. The air deflection leading edge preferably has a main extension direction in the peripheral direction. In the operating state, the wind guided by the air deflector on the cooling unit outer surface is preferably introduced into the cooling unit on the air introduction edge. In this regard, the air introduction edge is preferably arranged downstream of the air deflection leading edge. In particular, the air deflector is in contact with the incident wind for the last time on the air introduction edge before this wind is deflected into the cooling unit for the cooling.

Moreover, according to a preferred embodiment of the air cooling device it is provided that the cooling unit outer surface has a cooling unit leading edge and the air deflector is arranged on the cooling unit such that the cooling unit leading edge is arranged in the axial direction between the air deflection leading edge and the air introduction edge. Preferably, the cooling unit leading edge is the first end of the cooling unit. In particular, the cooling unit leading edge is arranged in the flow direction of the wind downstream of the air deflection leading edge and upstream of the air introduction edge. By this arrangement, the cooling power preferably may be further increased.

According to a further preferred development, starting from the cooling unit leading edge, the cooling unit outer surface extends in the axial direction with a cooling unit cooling length and the spacing between the air deflection leading edge and the cooling unit leading edge is at least 0% of the cooling unit cooling length and a maximum of 100% of the cooling unit cooling length. In particular, the cooling unit extends between the first end and the second end with the cooling unit cooling length. This has the advantage, in particular, that the wind for cooling the generator may be guided in an improved manner to the cooling unit outer surface of the cooling unit. In particular, as a result, the cooling power may be advantageously increased by this arrangement.

According to a further preferred development of the air cooling device, the air deflector has a fourth air deflection unit which extends outwardly at an obtuse angle in the radial direction starting from the cooling unit outer surface. The obtuse angle, in particular, is an angle which is larger than 90° and smaller than 180°. The obtuse angle, in particular, is the angle between the cooling unit outer surface and the fourth air deflection unit which opens in the flow direction of the wind. In particular, it is to be understood that a fourth acute angle, which in the operating state faces away from the incident flow direction of the wind, is formed between the fourth air deflection unit and the cooling unit outer surface. The fourth acute angle is preferably larger than 0° and smaller than 90°. In particular, the fourth acute angle and the fourth obtuse angle together form 180°.

This advantageously reduces vibrations. As a result, the sound emissions may be minimized. Moreover, the air cooling device is protected by the minimized vibrations, which in turn increases the service life of the air cooling device.

According to a further aspect provided is a generator of a wind power installation comprising an air cooling device as described above.

According to one aspect provided is an air guiding device comprising one or more air guiding units on the rotational unit outer surface of the rotational unit between the connections or the through-openings, extending outwardly in a radial direction starting from the rotational unit outer surface and being configured to deflect the wind to the cooling unit for the air cooling of the generator.

The rotational unit, in particular, is a spinner, a hub or any other suitable element of the aerodynamic rotor of a wind power installation.

The one or more air guiding units are configured, in particular, to be blade-shaped. It may be preferred that the one or more air guiding units have a profile with a curvature. In particular, the one or more air guiding units have a linear and/or convex and/or concave and/or S-shaped profile. In particular, the one or more air guiding units have a profile with an edge and/or a projection.

It is also preferred that the air guiding device has one or more covers. In particular, it may be preferably provided that the one or more air guiding units have a cover for guiding the wind. In particular, the one or more covers is arranged on an external side of the one or more air guiding units in the radial direction. In particular, the one or more covers are arranged on the rotational unit such that the one or more air guiding units extend in the radial direction between the rotational unit outer surface of the rotational unit and the cover. It is to be understood that the one or more covers form one or more air guiding channels with the one or more air guiding units and the rotational unit outer surface. The air guiding channels are particularly preferably suitable for deflecting the wind which flows onto and around the wind power installation in the operating state thereof in the direction of the generator to be cooled, in particular in the direction of a cooling unit which is configured or arranged on the generator, for improved cooling power.

The rotational unit extends in the axial direction with a rotational unit length. The one or more air guiding units extend in the axial direction with an air guiding unit length. Preferably, the one or more air guiding units extend with an air guiding unit length which corresponds at least to 10%, 20%, 30%, 40%, 50%, 60%, 70%, 80%, 90%, 100%, 110%, 120%, 130%, 140%, 150% or more of the rotational unit length and/or to a maximum of 10%, 20%, 30%, 40%, 50%, 60%, 70%, 80%, 90%, 100%, 110%, 120%, 130%, 140%, 150% or less of that of the rotational unit length. Moreover, the one or more air guiding units extend in the radial direction with an air guiding unit height.

Preferably the one or more air guiding units extend with the air guiding unit height which corresponds at least to 1%, 10%, 20%, 30%, 40%, 50%, 60%, 70%, 80%, 90%, 100%, 110%, 120%, 130%, 140%, 150%, 1000% or more of the air guiding unit length, and/or a maximum of 1%, 10%, 20%, 30%, 40%, 50%, 60%, 70%, 80%, 90%, 100%, 110%, 120%, 130%, 140%, 150%, 1000% or less of the air guiding unit length.

It is also preferred that the one or more air guiding units extend outwardly at an angle in the radial direction starting from the rotational unit outer surface. In particular, it is provided that the one or more air guiding units extend outwardly at an inclination angle in the radial direction starting from the rotational unit outer surface. Preferably, the inclination angle is at least −85°, −80°, −70°, −60°, −50°, −40°, −30°, −20°, −10°, 0°, +10°, +20°, +30°, +40°, +50°, +60°, +70°, +80°, +85° and/or a maximum of −85°, −80°, −70°, −60°, −50°, −40°, −30°, −20°, −10°, 0°, +10°, +20°, +30°, +40°, +50°, +60°, +70°, +80° or +85°.

It is also preferred that the one or more air guiding units are arranged relative to the axial direction, in particular relative to the rotational axis, at an incident flow angle. The incident flow angle describes an angle of the one or more air guiding units relative to the rotational axis, about an axis which is at right angles to the rotational unit outer surface. Preferably the incident flow angle is at least −85°, −80°, −70°, −60°, −50°, 40°, −30°, −20°, −10°, 0°, +10°, +20°, +30°, +40°, +50°, +60°, +70°, +80°, +85° and/or a maximum of −85°, −80°, −70°, −60°, −50°, −40°, −30°, −20°, −10°, 0°, +10°, +20°, +30°, +40°, +50°, +60°, +70°, +80°, +85°.

According to a preferred embodiment of the air guiding device, it is provided that the rotational unit extends in an axial direction between a first end which in the operating state of the wind power installation is arranged upstream relative to the wind direction of the wind, and a second end which in the operating state of the wind power installation is arranged downstream of the first end relative to the wind direction of the wind, wherein the one or more air guiding units are arranged on the rotational unit such that they extend between the first and second end of the rotational unit and/or extend beyond the second end in the axial direction. Additionally or alternatively, it is provided that the one or more air guiding units extend outwardly at an inclination angle in the radial direction starting from the rotational unit outer surface.

According to a further aspect provided is a wind power installation having an above-described generator and/or an above-described air guiding device.

According to further aspect provided is a method for producing a generator of a wind power installation with an air cooling device, comprising the steps: providing a cooling unit of a generator and an air deflector which has a first and/or second and/or third stationary air deflection unit which is configured as a partial ring segment; arranging the air deflector on a cooling unit outer surface, wherein preferably the cooling unit has a plurality of cooling ribs which have a main extension in an axial direction and which are arranged spaced apart in a peripheral direction at right angles to the axial direction, and the air deflector preferably has a main extension substantially in a peripheral direction, at right angles to the axial direction; and fastening the air deflector to the cooling unit outer surface.

According to a preferred embodiment, the step of fastening the air deflector to the cooling outer surface comprises: a material connection, in particular a welded connection, and/or a non-positive connection, in particular a screw connection, and/or a positive connection of the air deflector to the cooling unit and/or a material connection, in particular a welded connection, and/or a non-positive connection, in particular a screw connection, and/or a positive connection, of adjacently arranged partial ring segments of a first air deflection unit, so that these partial ring segments form a first air deflection unit which is configured as a ring and/or of adjacently arranged partial ring segments of a second air deflection unit, so that these partial ring segments form a second air deflection unit which is configured as a ring and/or of adjacently arranged partial ring segments of a third air deflection unit, so that these partial ring segments form a third air deflection unit which is configured as a ring, and/or preferably arranging a damping unit between the air deflector and the cooling unit.

According to a further aspect provided is a method for producing a wind power installation, comprising the steps: providing a rotational unit of an aerodynamic rotor of the wind power installation with a rotational unit outer surface, the wind flowing along said rotational unit outer surface during the operation of the wind power installation, arranging one or more air guiding units on the rotational unit outer surface of the rotational unit between the connections or the through-openings and/or fastening the rotational unit to a generator, in particular an above-described generator or a generator produced according to an above-described method.

For the advantages, variants and details of these further aspects of the invention and their respective developments, reference is also made in each case to the remaining description of the corresponding advantages, variants and details of the remaining aspects.

BRIEF DESCRIPTION OF THE SEVERAL VIEWS OF THE DRAWINGS

Preferred embodiments of the invention are described by way of example with reference to the accompanying figures, in which.

DETAILED DESCRIPTION

Figure 1:
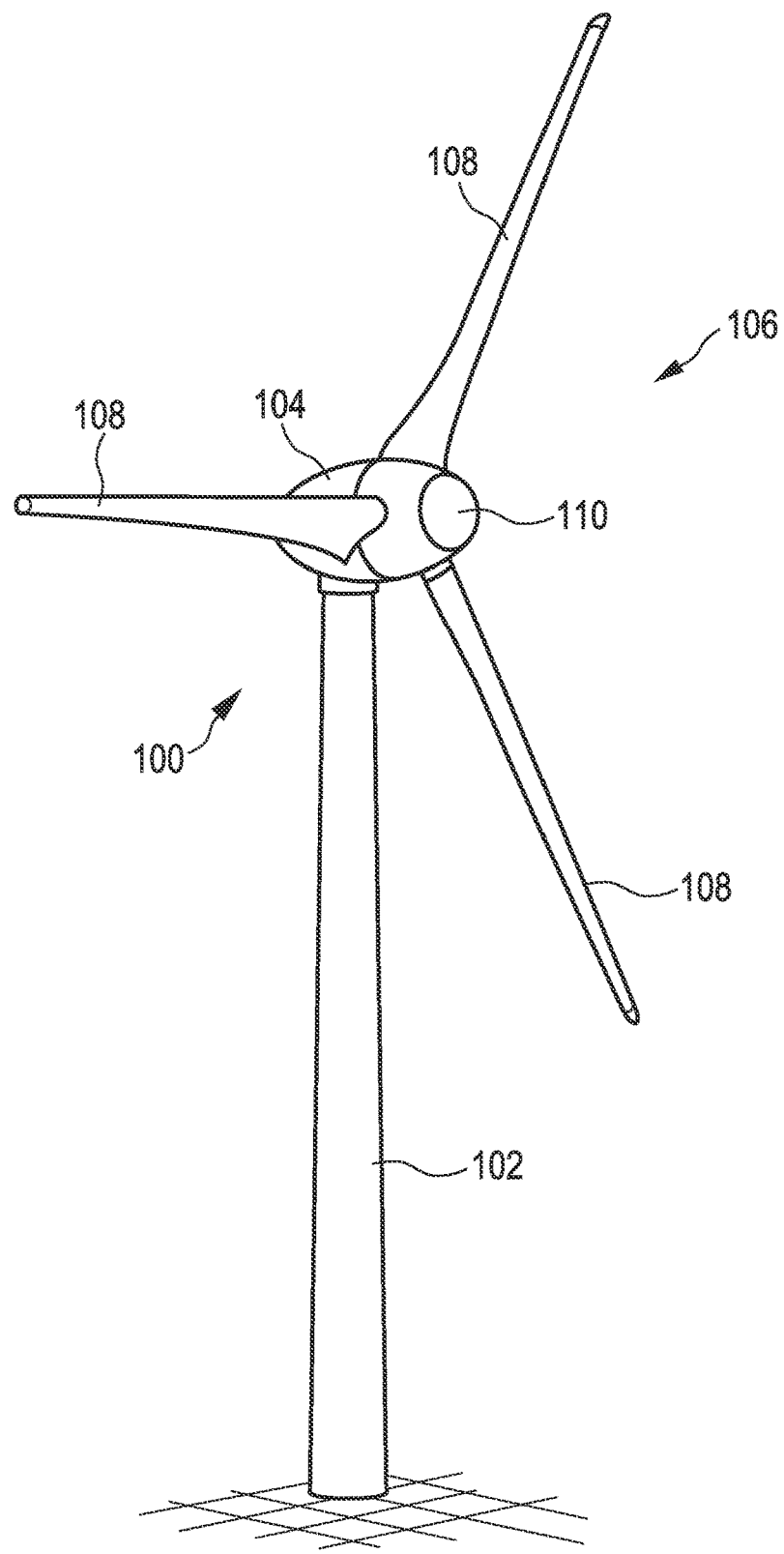
FIG. 1 shows a schematic view of a wind power installation.

FIG. 1 shows a schematic view of a wind power installation 100 according to the invention. The wind power installation 100 has a tower 102 and a nacelle 104 on the tower 102. An aerodynamic rotor 106 with three rotor blades 108 and a spinner 110 is provided on the nacelle 104. During operation of the wind power installation the aerodynamic rotor 106 is set in rotary motion by the wind and thus also rotates an electrodynamic rotor or rotor unit of a generator which is coupled directly or indirectly to the aerodynamic rotor 106. The electric generator is arranged in the nacelle 104 and generates electrical energy.

Figure 2:
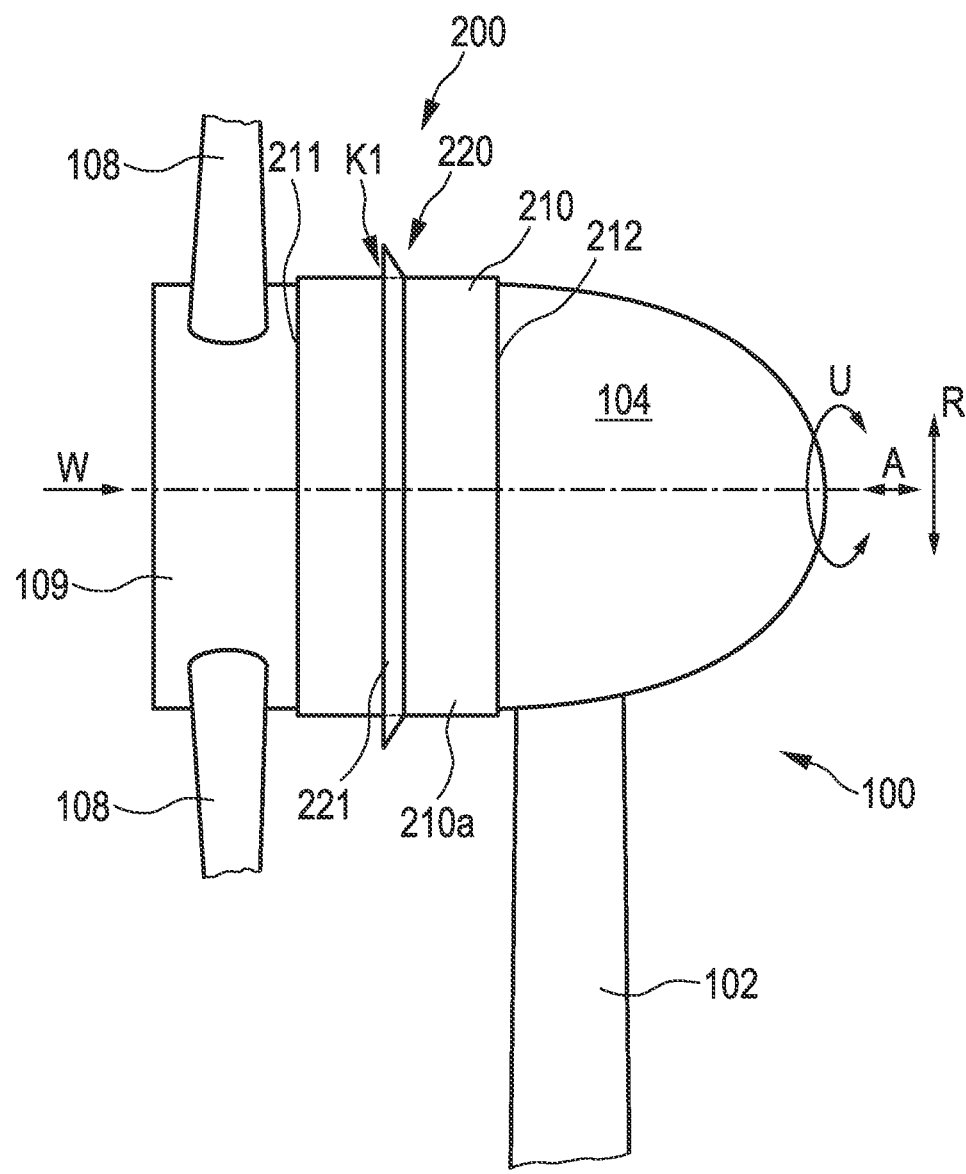
FIG. 2 shows a schematic side view of a wind power installation with a generator with a first exemplary embodiment of an air cooling device.
Figure 3:
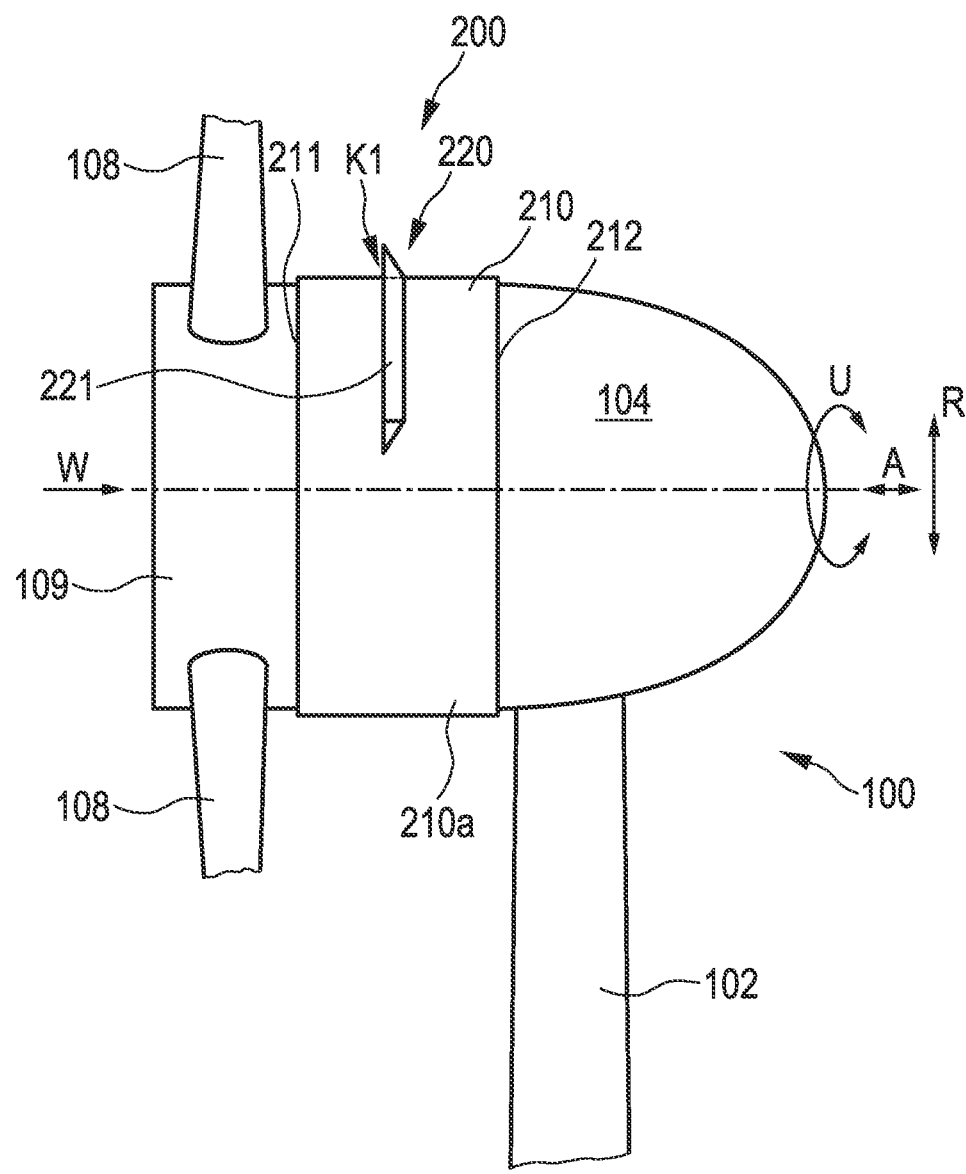
FIG. 3 shows a schematic side view of a wind power installation with a generator with a second exemplary embodiment of an air cooling device.

FIGS. 2 and 3 show in each case a schematic side view of a wind power installation 100 with a generator with a first and second preferred embodiment of an air cooling device 200. The wind power installation 100 shown in FIGS. 2 and 3 is based on the wind power installation 100 described in FIG. 1. A cooling unit 210 of the generator, onto which in the operating state of the wind power installation 100 wind W flows for the passive cooling of the generator, is arranged on the nacelle 104. To this end, the cooling unit 210 is configured to be annular and has a radially external cooling unit outer surface 210a, the wind W flowing along said cooling unit outer surface for cooling the generator. Correspondingly, the nacelle has an annular opening for receiving the cooling unit.

An air cooling device 200 is arranged on the cooling unit 210, i.e., in the present case on the cooling unit outer surface 210a. The air cooling device 200 has a first air deflection unit 221 which extends outwardly at an acute angle in the radial direction R starting from the cooling unit outer surface 210a. As a result, the first air deflection unit 221 forms a first air deflection channel K1 with the cooling unit outer surface 210a. The cross section of the first air deflection channel K1 decreases in the axial direction A in the wind direction. In this regard, the first air deflection channel K1 is a converging air deflection channel which converges in the wind direction, i.e., downstream. As a result, the first air deflection channel K1 deflects the wind W in the direction of the cooling unit 210 for the air cooling of the generator.

The cooling unit 210 extends in the axial direction A between a first end 211 which in the operating state of the wind power installation 100 is arranged upstream relative to the wind direction of the wind W, and a second end 212 which in the operating state of the wind power installation 100 is arranged upstream of the first end 211 relative to the wind direction of the wind W. The first air deflection unit 221 is arranged centrally between the first end 211 and the second end 212 relative to the extension of the cooling unit 210 in the axial direction A.

In the embodiment shown in FIG. 2, the air cooling device 200 is of annular configuration. In this preferred embodiment, the air cooling device 200 entirely encloses the cooling unit 210 or the generator. Alternatively, it may be preferred that the air cooling device 200 is configured to be partially annular as shown in FIG. 3. In this preferred embodiment, the air cooling device 200 merely partially encloses the cooling unit 210 or the generator.

The first air deflection unit 221 shown in FIGS. 2 and 3 of the air deflector 220 comprises a plurality of partial ring segments. The first air deflection unit 221 of the air cooling device 200 shown in FIG. 2 comprises, for example, six partial ring segments and the air cooling device 200 shown in FIG. 3 comprises, for example, two partial ring segments.

Figure 4A:
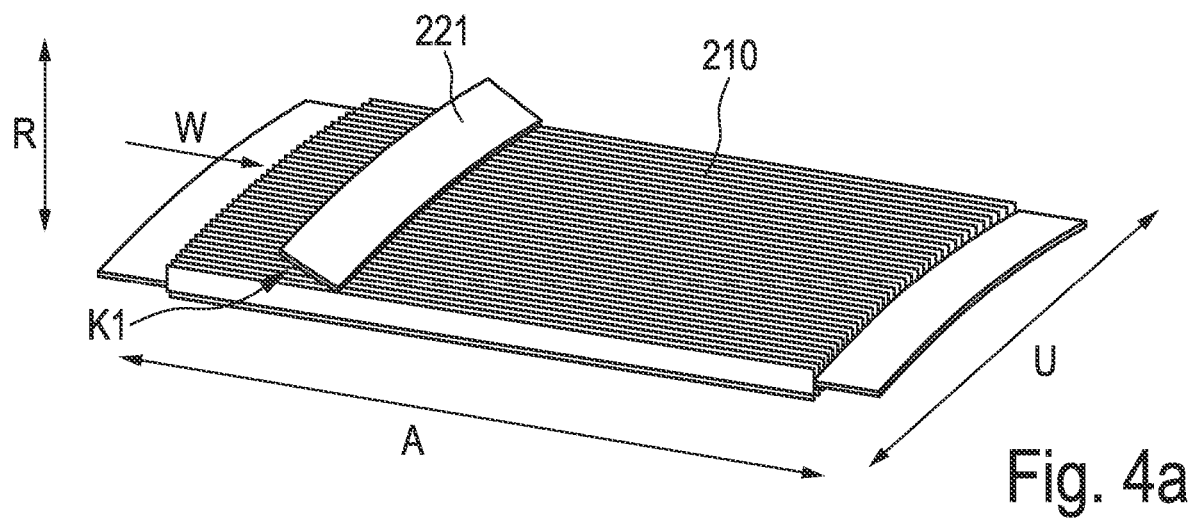
FIGS. 4a, 4b shows a schematic three-dimensional detailed view of a cooling unit with a first and second exemplary embodiment of an air cooling device with a first air deflection unit.
Figure 4B:
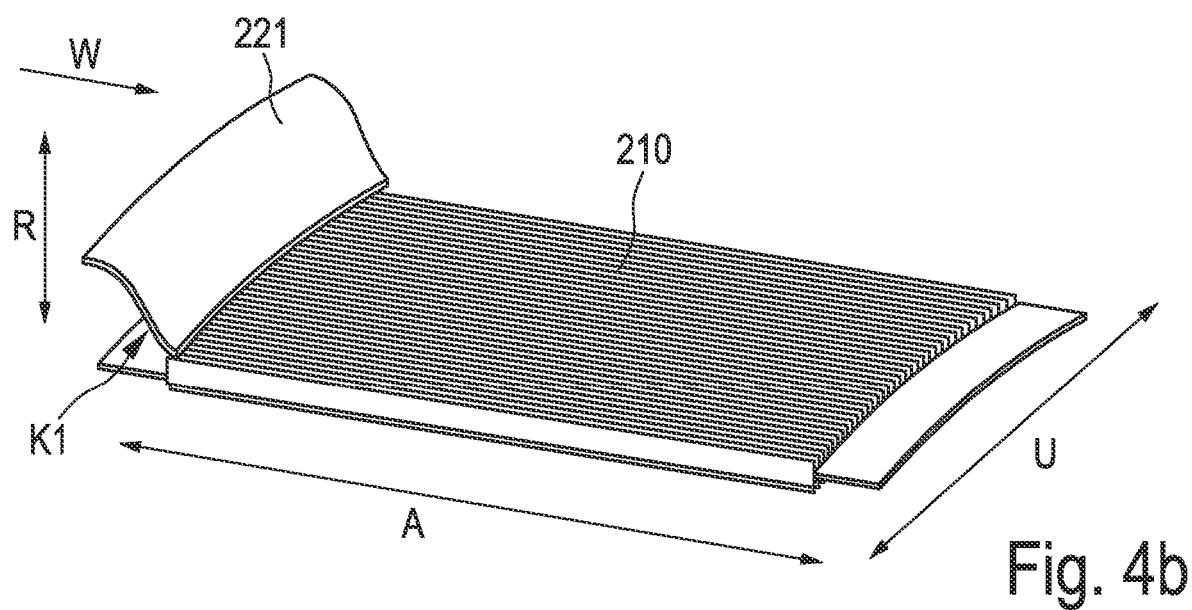

FIGS. 4a and 4b show in each case a schematic three-dimensional detailed view of a cooling unit 210 with a first and second exemplary embodiment of an air cooling device 200, with in each case a single first air deflection unit 221. It may be seen that the cooling unit 210 has a plurality of cooling ribs which have a main extension in the axial direction A and which are arranged spaced apart in the peripheral direction U at right angles to the axial direction A. The air deflector 220, however, has a main extension in the peripheral direction U which in the operating state of the wind power installation 100 is located substantially transversely to the wind direction of the wind W.

In the embodiment shown in FIG. 4a, the first air deflection unit 221 has a linear profile. In the embodiment shown in FIG. 4b the profile of the first air deflection unit 221 is of S-shaped configuration, thus has convex and concave profile portions. In both embodiments, the first air deflection unit 221 is arranged in a first third of the cooling unit 210 relative to the extension of the cooling unit 210 starting from the first end 211 in the axial direction. In the embodiment shown in FIG. 4b the first air deflection unit 221 is arranged at the first end 211 of the cooling unit 210. This achieves a particularly significant cooling effect in the first half of the cooling unit, but results in a smaller reduction in temperature in the second half of the cooling unit 210. In contrast thereto, the first air deflection unit 221 which is arranged centrally in the first third of the cooling unit, starting from the first end 211, achieves a cooling of the first two thirds of the cooling unit 210 and achieves a reduced cooling in the third third.

Figure 5:
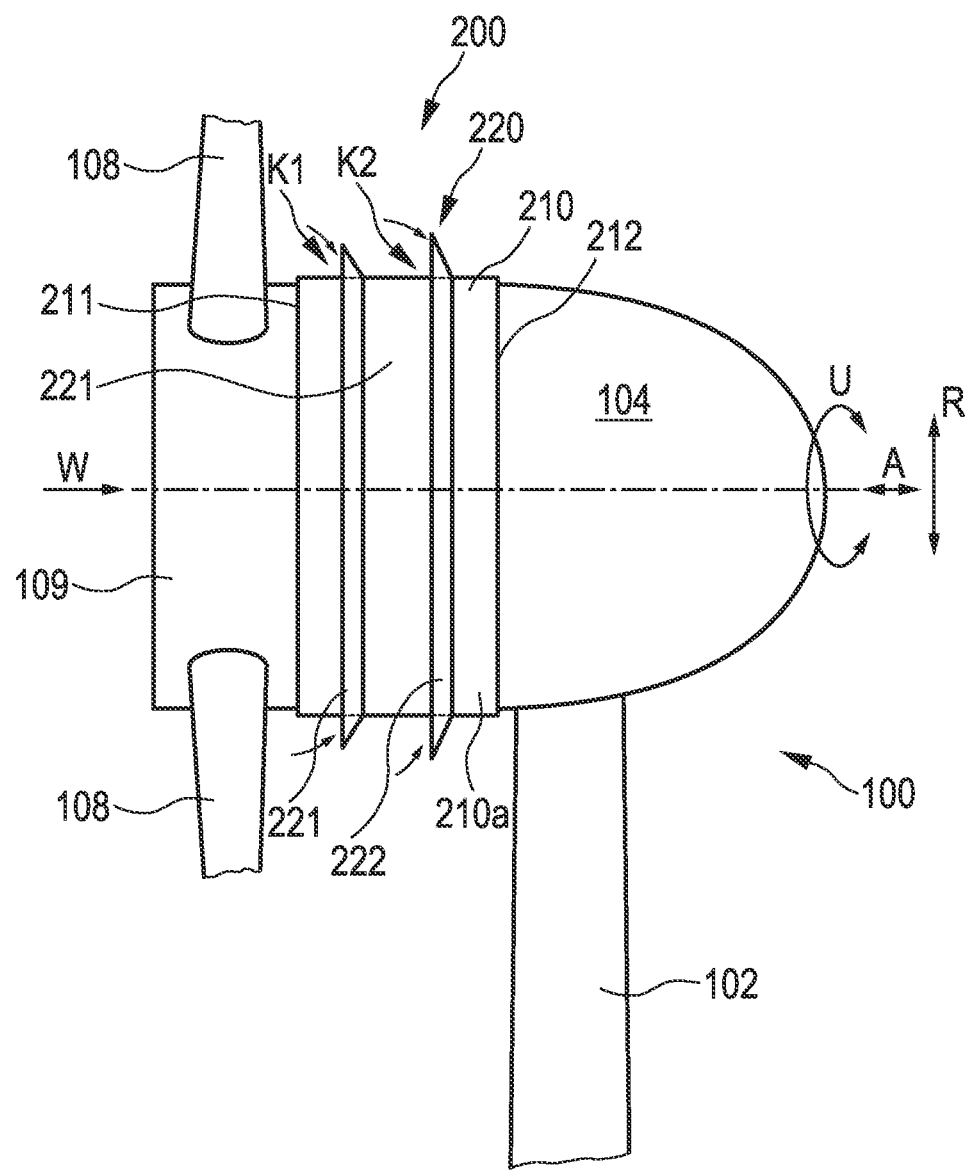
FIG. 5 shows a schematic side view of a wind power installation with a generator with a third exemplary embodiment of an air cooling device.

FIG. 5 shows a schematic side view of a wind power installation 100 with a generator with a third preferred embodiment of an air cooling device 200. This preferred embodiment is based on the embodiment shown in FIG. 2 of an air cooling device 200. The air cooling device 200 shown in FIG. 5 additionally has a second air deflection unit 222 which is arranged offset to the first air deflection unit 221 in the axial direction. This has the effect that more wind is supplied to the cooling unit for the cooling. A further effect of this arrangement is that the cooling unit 210 and thus the generator are evenly cooled, i.e., a smaller temperature gradient is present in the axial direction A and the peripheral direction U.

In the present embodiment, the first air deflection unit has a first acute angle, a first length and a first height. The second air deflection unit 222 correspondingly has a second acute angle, a second length and a second height. In the present case, the first length of the first air deflection unit 221 substantially corresponds to the second length of the second air deflection unit 222. The second height and the second acute angle of the second air deflection unit 222, however, are larger in comparison with the first acute angle and the first length of the first air deflection unit 221.

It may be seen that the cooling unit 210 extends in the axial direction A between a first end 211 which in the operating state of the wind power installation 100 is arranged upstream relative to the wind direction of the wind W, and a second end 212 which in the operating state of the wind power installation 100 is arranged upstream of the first end relative to the wind direction of the wind W. In this case, the first air deflection unit 221 is arranged in a first third of the cooling unit 210 relative to the extension of the cooling unit 210 starting from the first end 211 in the axial direction. The second air deflection unit 222 is arranged in a third third of the cooling unit 210 relative to the extension of the cooling unit 210 starting from the first end 211 in the axial direction A.

Figure 6:
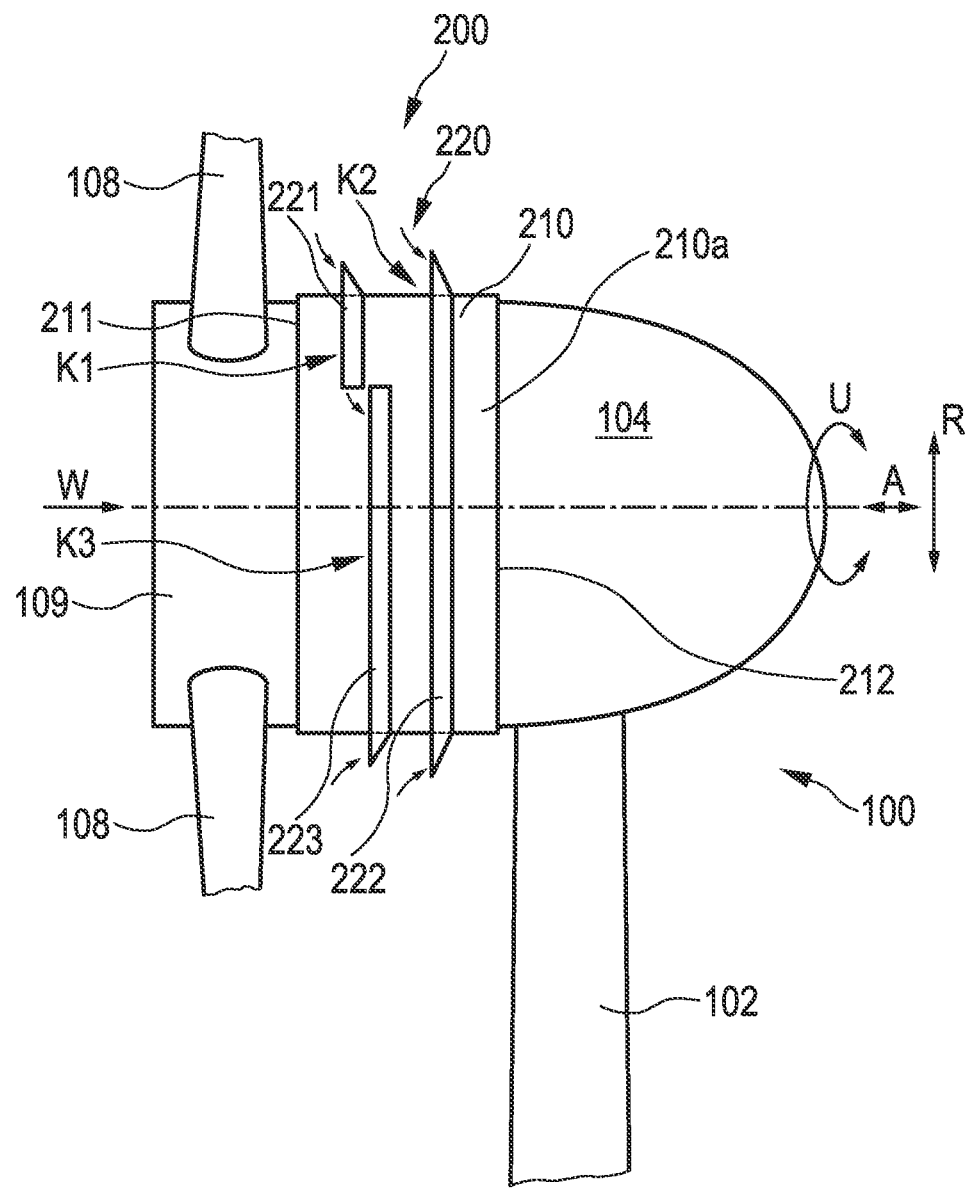
FIG. 6 shows a schematic side view of a wind power installation with a generator with a fourth exemplary embodiment of an air cooling device.

FIG. 6 shows a schematic side view of a wind power installation with a generator, with a fourth exemplary embodiment of an air cooling device 200. This preferred embodiment is based on the embodiment shown in FIG. 3 of an air cooling device 200. The air cooling device 200 shown in FIG. 6 additionally has a second and third air deflection unit 222, 223, which are arranged offset to one another in the axial direction. This has the effect that more wind is supplied to the cooling unit for the cooling. The effect of this arrangement is also that the cooling unit and thus the generator are evenly cooled, i.e., a smaller temperature gradient is present in the axial direction and the peripheral direction.

It may be seen that the first air deflection unit 221 is arranged as a partial ring segment which is arranged on an upper face of the nacelle 104 in the operating state of the wind power installation 100. The second air deflection unit 222 is of annular configuration. The second air deflection unit is arranged offset thereto in the axial direction A—similar to FIG. 5. Moreover, a third air deflection unit 223 is arranged between the first and second air deflection unit 221, 222 in the axial direction A. The third air deflection unit 223 comprises a plurality of partial ring segments and is configured to be partially annular.

In the present embodiment, the first air deflection unit has a first acute angle, a first length and a first height. The second air deflection unit 222 correspondingly has a second acute angle, a second length and a second height. Moreover, the third air deflection unit 223 has a third acute angle, a third length and a third height. In the present case, the first length of the first air deflection unit 221 substantially corresponds to the second and third length of the second and third air deflection unit 222, 223. The third height and the third acute angle of the third air deflection unit 223 correspond to the first height and to the first acute angle of the first air deflection unit 221. In the peripheral direction, the first air deflection unit 221 has a smaller width than the second air deflection unit 222. The second height and the second acute angle of the second air deflection unit 222, however, are larger in comparison with the first and third acute angle and the first and third length of the first and third air deflection unit 221, 223.

Figure 7A:
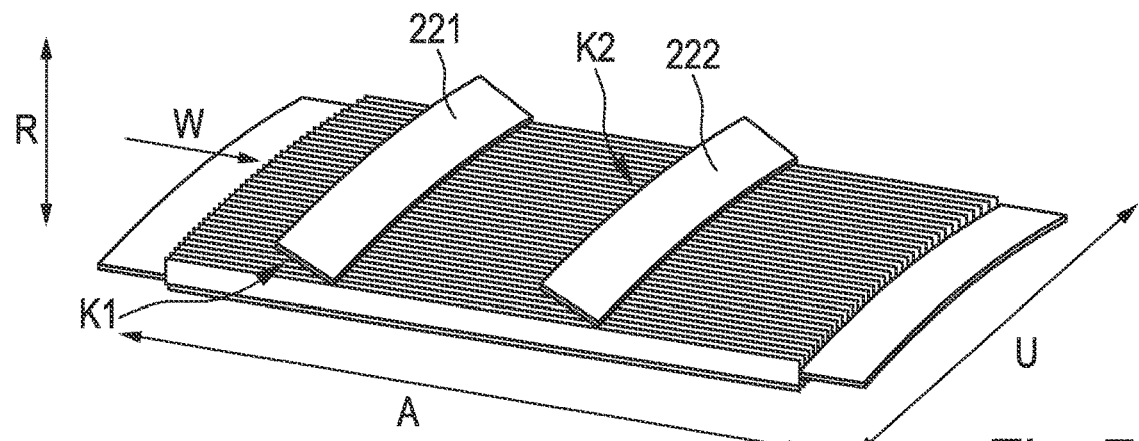
FIGS. 7a, 7b, 7c show a schematic three-dimensional view of a cooling unit with a first, second and third exemplary embodiment of an air cooling device with a first and second air deflection unit.
Figure 7B:
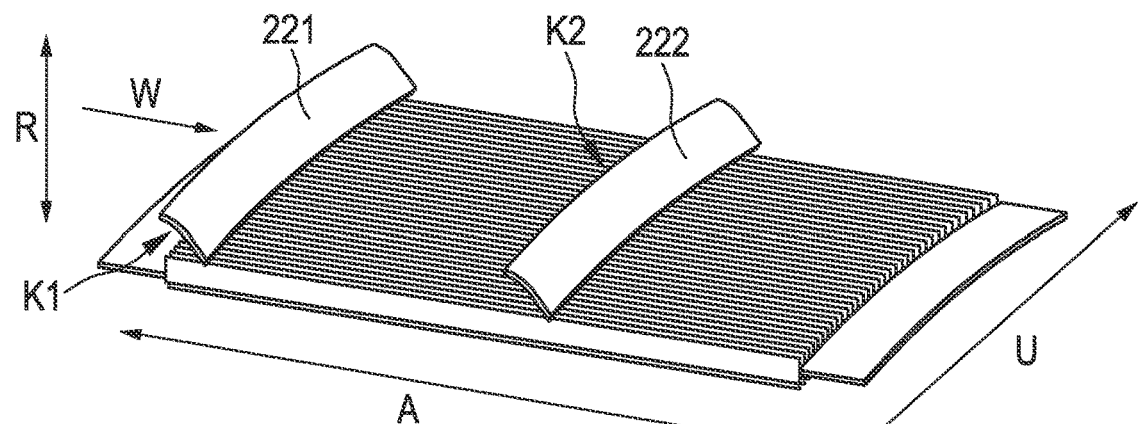
Figure 7C:
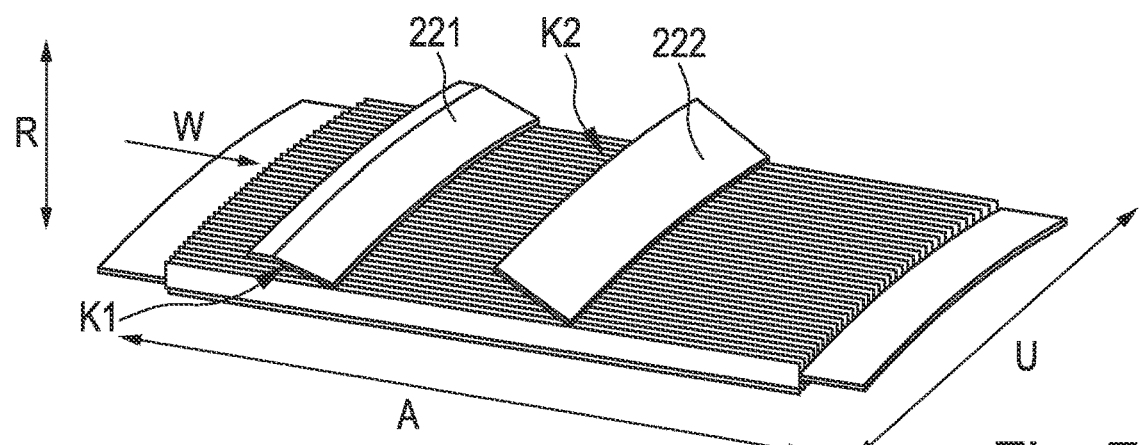

FIGS. 7a, 7b and 7c show a schematic three-dimensional view of a cooling unit 210 with a first, second and third exemplary embodiment of an air cooling device 200 with a first and second air deflection unit 221, 222. In all three exemplary embodiments, the first air deflection unit 221 is arranged in a first third and the second air deflection unit 222 at the transition from the second third to the third third. In the embodiment shown in FIG. 7b, the first air deflection unit is arranged in the region of the first end 211.

The three exemplary embodiments shown in FIGS. 7a, 7b and 7c show various preferred embodiments of profiles of the air deflection units 221, 222, 223. In FIG. 7a the first and second air deflection unit 221, 222 have a linear profile. The first and second air deflection unit 221, 222 have the same length, width and height. In the example shown in FIG. 7b, the first and second air deflection unit have an S-shaped profile. The length, width and height of the first and second air deflection unit 221, 222 are substantially identical. In the exemplary embodiment shown in FIG. 7c of the air deflector 220, the first air deflection unit 221 has a profile with an edge. The edge divides the profile into two linear profile portions having a different gradient. The second air deflection unit 222 has a linear profile. In particular, the edge has an edge length which preferably corresponds at least to 0% and a maximum of 200% of the cooling unit length which extends between the first end 211 and second end 212. The second height and the second acute angle of the second air deflection unit 222, however, are larger than the first height and the first acute angle of the first air deflection unit 221.

Figure 8:
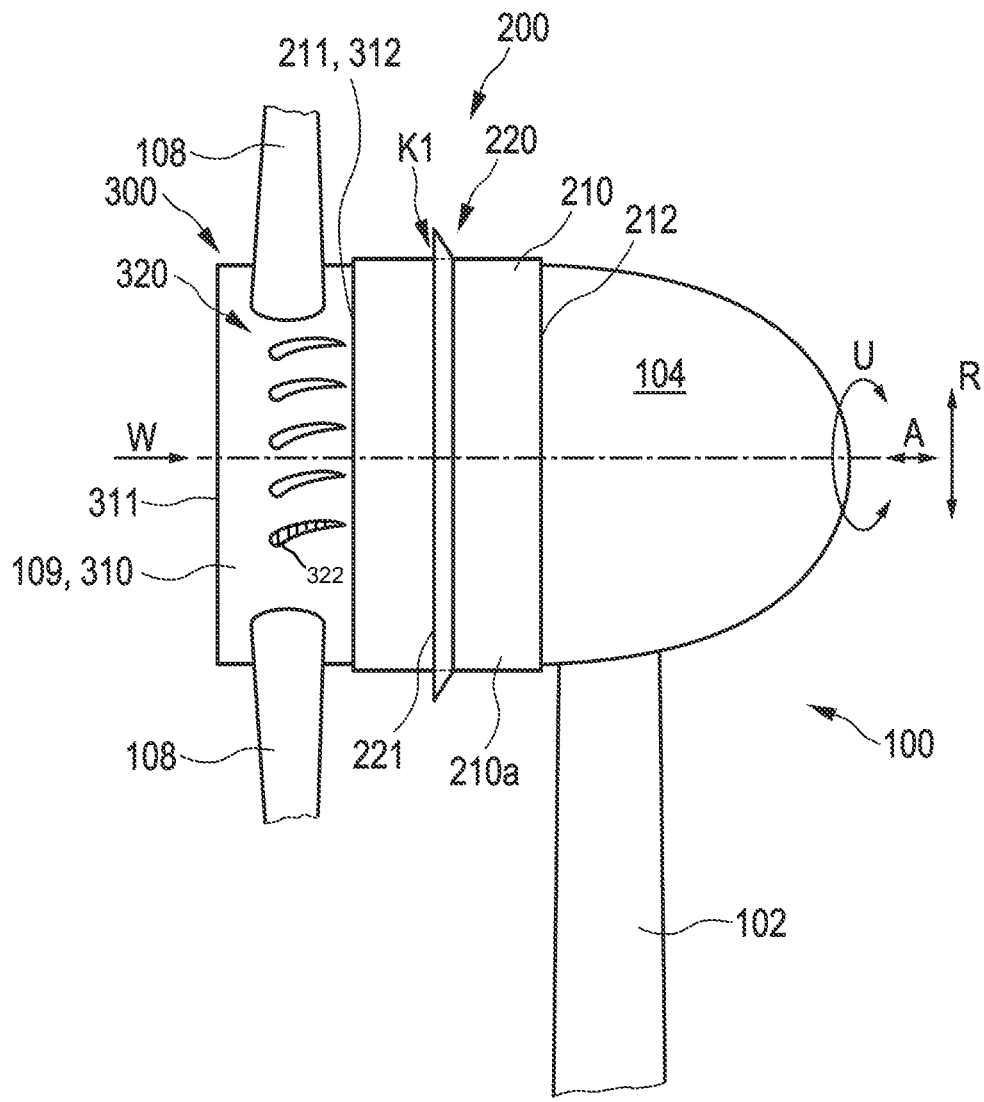
FIG. 8 shows a schematic side view of a wind power installation with a generator based on FIG. 2 with a first exemplary embodiment of an air guiding device.

FIG. 8 shows a schematic side view of a wind power installation 100 with a generator based on FIG. 2, with a first exemplary embodiment of an air guiding device 300.

The air guiding device 300 is configured for providing wind W for the air cooling to a cooling unit 210 of a generator of a wind power installation 100. The air guiding device 300 comprises a rotational unit 310 of an aerodynamic rotor 106 of the wind power installation 100 with a rotational unit outer surface 310a, the wind W flowing along said rotational unit outer surface during the operation of the wind power installation 100. In this case, the rotational unit 310 has connections for fastening and/or through-openings for passing through rotor blades 108 of the aerodynamic rotor 106. Moreover, the air guiding device 300 has a plurality of air guiding units 320 which are arranged on the rotational unit outer surface 310a of the rotational unit 310 between the connections or the through-openings. The air guiding units 320 extend outwardly in a radial direction R starting from the rotational unit outer surface 310a and are configured to deflect the wind W to the cooling unit 210 for the air cooling of the generator.

The air guiding units are configured to be blade-shaped and have a concave profile.

It may be seen that the rotational unit 310 extends in an axial direction A between a first end 311 which in the operating state of the wind power installation 100 is arranged upstream relative to the wind direction W of the wind, and a second end 312 which in the operating state of the wind power installation 100 is arranged downstream of the first end 311 relative to the wind direction of the wind W. In this case, the air guiding units 320, which are shown in the exemplary embodiment shown in FIG. 8, extend between the first and second end 311, 312 of the rotational unit 310.

FIG. 8 shows one of the air guiding units with a cover 322, which is shown in cross section.

Figure 9:
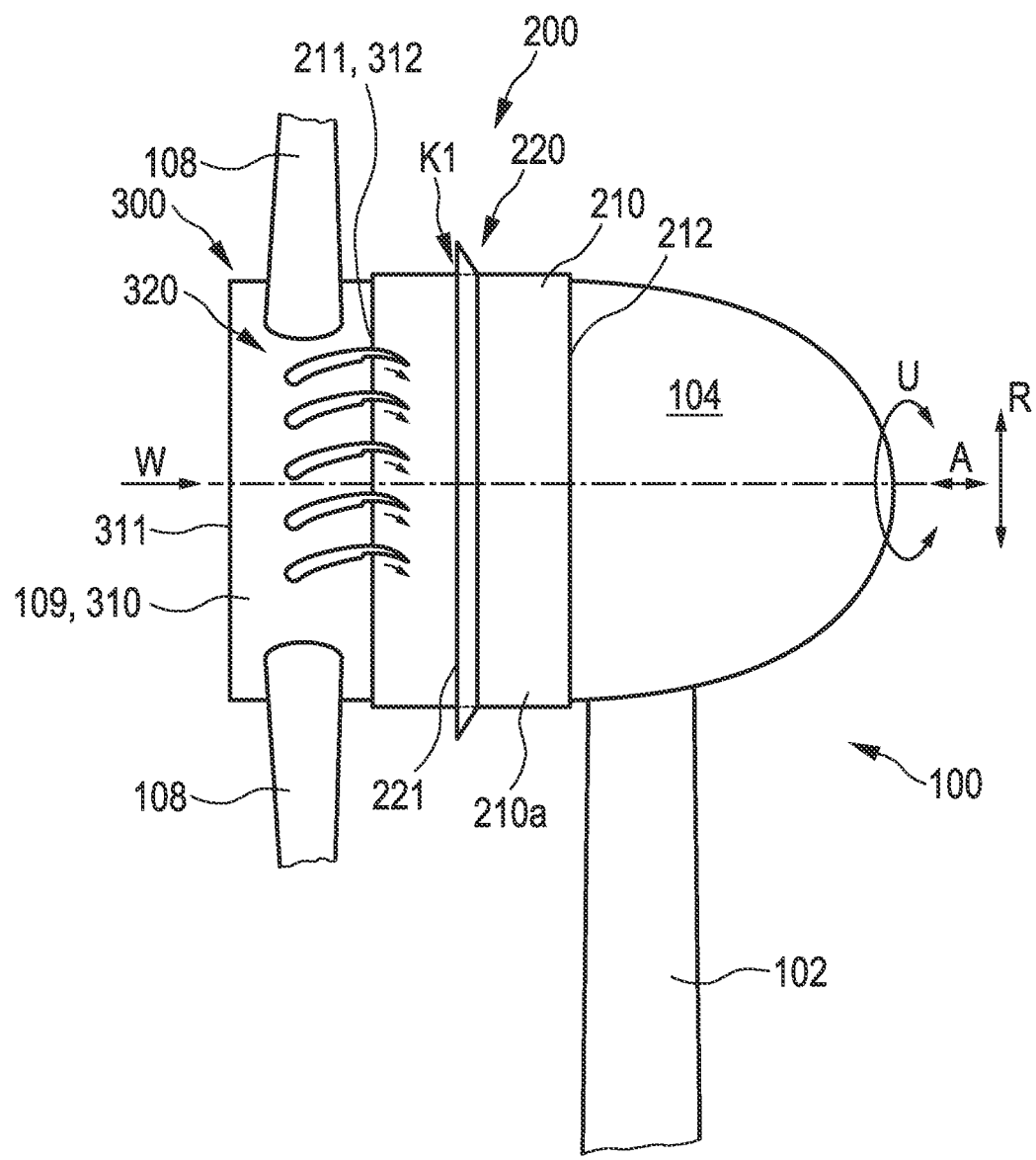
FIG. 9 shows a schematic side view of a wind power installation with a generator based on FIG. 2 with a second exemplary embodiment of an air guiding device.

FIG. 9 shows a schematic side view of a wind power installation 100 with a generator based on FIG. 2 with a second exemplary embodiment of an air guiding device 300. The exemplary embodiment shown in FIG. 9 is similar to the exemplary embodiment shown in FIG. 8 of the air guiding device 300. The two exemplary embodiments are substantially different in that, in contrast to the exemplary embodiment shown in FIG. 8, in the exemplary embodiment shown in FIG. 9 the air guiding units 320 extend in the axial direction A beyond the second end 312. Moreover, the air guiding units shown in FIG. 9 have a blade-shaped profile with an edge or a projection in the profile path.

Figure 10A:
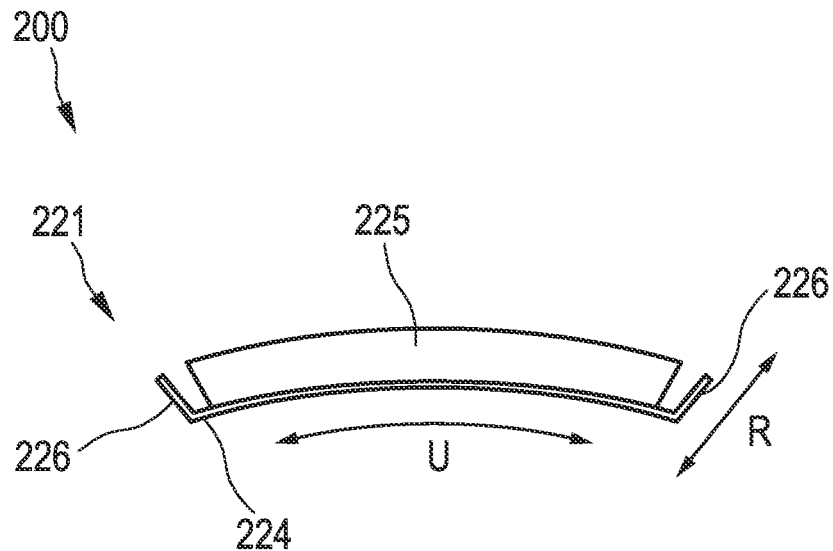
FIGS. 10a, 10b show a schematic front and side view of an exemplary embodiment of an air deflection unit.
Figure 10B:
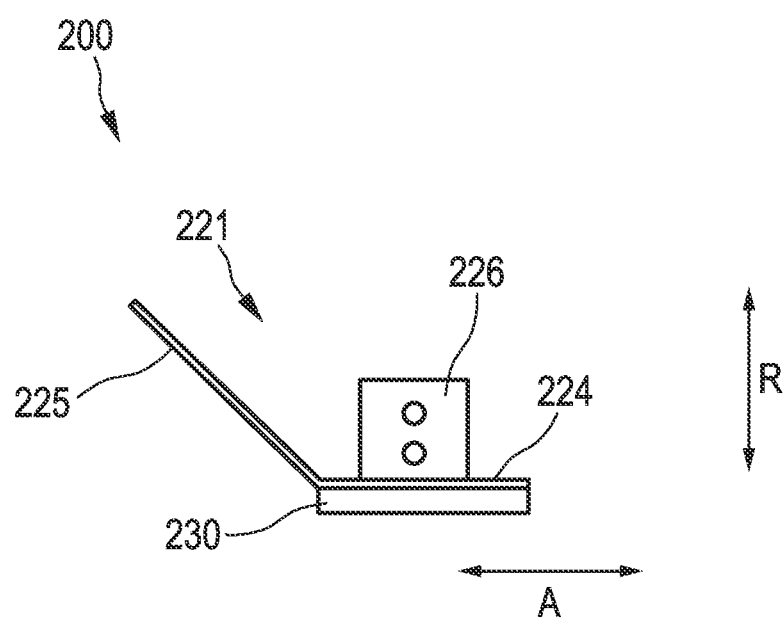

FIGS. 10a and 10b show a schematic front and side view of an exemplary embodiment of a first air deflection unit 321. The views and corresponding description also correspondingly apply to the second and third air deflection unit 222, 223.

The first air deflection unit 221 has a main extension direction in the peripheral direction U. The first air deflection unit 221 comprises a base element 224, the air deflection unit being arranged thereby on the cooling unit 210. An air deflection unit element 225 extends from the base element 224, said air deflection element in the operating state of the wind power installation extending outwardly at an acute angle in the axial direction A and radial direction R starting from the base element 224. It may also be seen that the air deflection element extends between two flanges 226 in the peripheral direction. The flanges extend outwardly in the peripheral direction U and the radial direction R starting from the base element 224. Adjacently arranged partial ring segments of an air deflection unit may be fastened together in the peripheral direction by means of the flanges.

In the preferred embodiment shown here, a damping unit 230 is also provided, said damping unit in the operating state of the wind power installation 100 being arranged between the base element 224 and the cooling unit 210.

Figure 11:
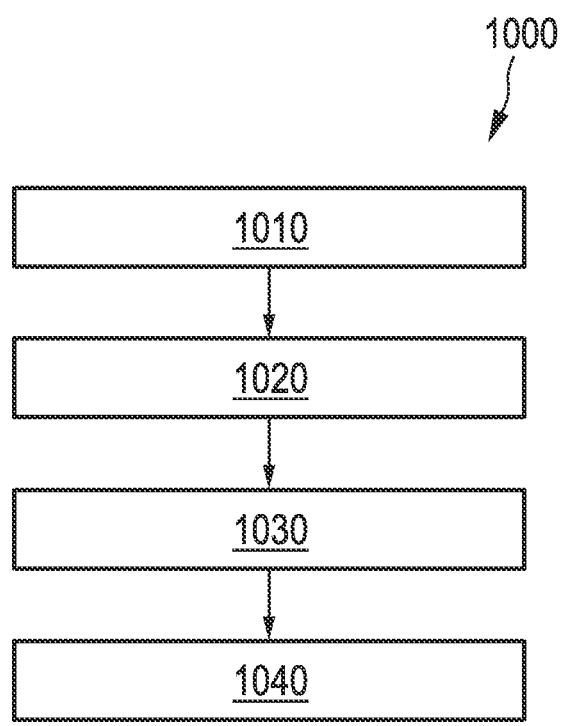
FIG. 11 shows a schematic flow diagram of an exemplary method for producing a generator of a wind power installation with an air cooling device.

FIG. 11 shows a schematic flow diagram of an exemplary method 1000 for producing a generator of a wind power installation 100 with an air cooling device 200. The method 1000 comprises initially providing 1010 a cooling unit 210 of a generator and an air deflector 220 which has a first and/or second and/or third stationary air deflection unit 221, 222, 223 configured as a partial ring segment. In a further step, the method 1000 comprises arranging 1020 the air deflector 220 on a cooling unit outer surface 210a, wherein preferably the cooling unit 210 has a plurality of cooling ribs which have a main extension in an axial direction A and which are arranged spaced apart in a peripheral direction U at right angles to the axial direction A and the air deflector 220 preferably has a main extension substantially in a peripheral direction U, at right angles to the axial direction A. Finally, the method 1000 comprises fastening 1030 the air deflector 220 to the cooling outer surface 210a.

The step of fastening 1030 the air deflector 220 to the cooling unit outer surface 210a comprises, in particular, a material connection. The material connection is preferably a welded connection. Additionally or alternatively, the step of fastening 1030 comprises a non-positive connection. The non-positive connection is, in particular, a screw and/or magnetic connection. Moreover, the step of fastening 1030 additionally or alternatively comprises a positive connection of the air deflector 220 to the cooling unit 210. The positive connection is implemented, in particular, by a hook connection.

The step of fastening 1030 the air deflector 220 to the cooling unit outer surface 210a may also preferably be a material connection, in particular a welded connection, and/or a non-positive connection, in particular a screw and/or magnetic connection, and/or a positive connection, in particular a hook and/or snap connection, of adjacently arranged partial ring segments of a first air deflection unit 221, so that these partial ring segments form a first air deflection unit 221 which is configured as a ring or partial ring.

Moreover, the step of fastening 1030 the air deflector 220 to the cooling unit outer surface 210a may preferably be a material connection, in particular a welded connection, and/or a non-positive connection, in particular a screw and/or magnetic connection, and/or a positive connection, in particular a hook and/or snap connection, of adjacently arranged partial ring segments of a second air deflection unit 222 so that these partial ring segments form a second air deflection unit 222 which is configured as a ring or partial ring.

Moreover the step of fastening 1030 the air deflector 220 to the cooling unit outer surface 210a preferably may be a material connection, in particular a welded connection, and/or a non-positive connection, in particular a screw and/or magnetic connection, and/or a positive connection, in particular a hook and/or snap connection, of adjacently arranged partial ring segments of a third air deflection unit 223, so that these partial ring segments form a third air deflection unit 223 which is configured as a ring or partial ring.

Moreover, it may be preferred that the method 100 comprises the step of arranging 1040 a damping unit 230 between the air deflector 220 and the cooling unit 210.

Figure 12:
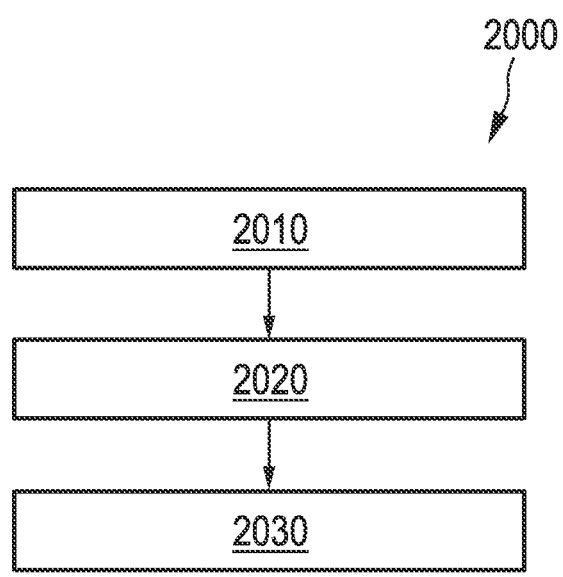
FIG. 12 shows a schematic flow diagram of an exemplary method for producing a wind power installation.

FIG. 12 shows a schematic flow diagram of an exemplary method 2000 for producing a wind power installation 100. The method 2000 for producing the wind power installation 100 comprises the step of providing 2010 a rotational unit 310 of an aerodynamic rotor 106 of the wind power installation 100 with a rotational unit outer surface 310a, the wind W flowing along said rotational unit outer surface during the operation of the wind power installation 100. Moreover, the method 2000 comprises arranging 2020 one or more air guiding units 320 on the rotational unit outer surface 310a of the rotational unit 310 between the connections or the through-openings. Moreover, the method 2000 comprises fastening 2030 the rotational unit 310 to a generator or a generator produced according to the above-described method 1000.

Figure 13:
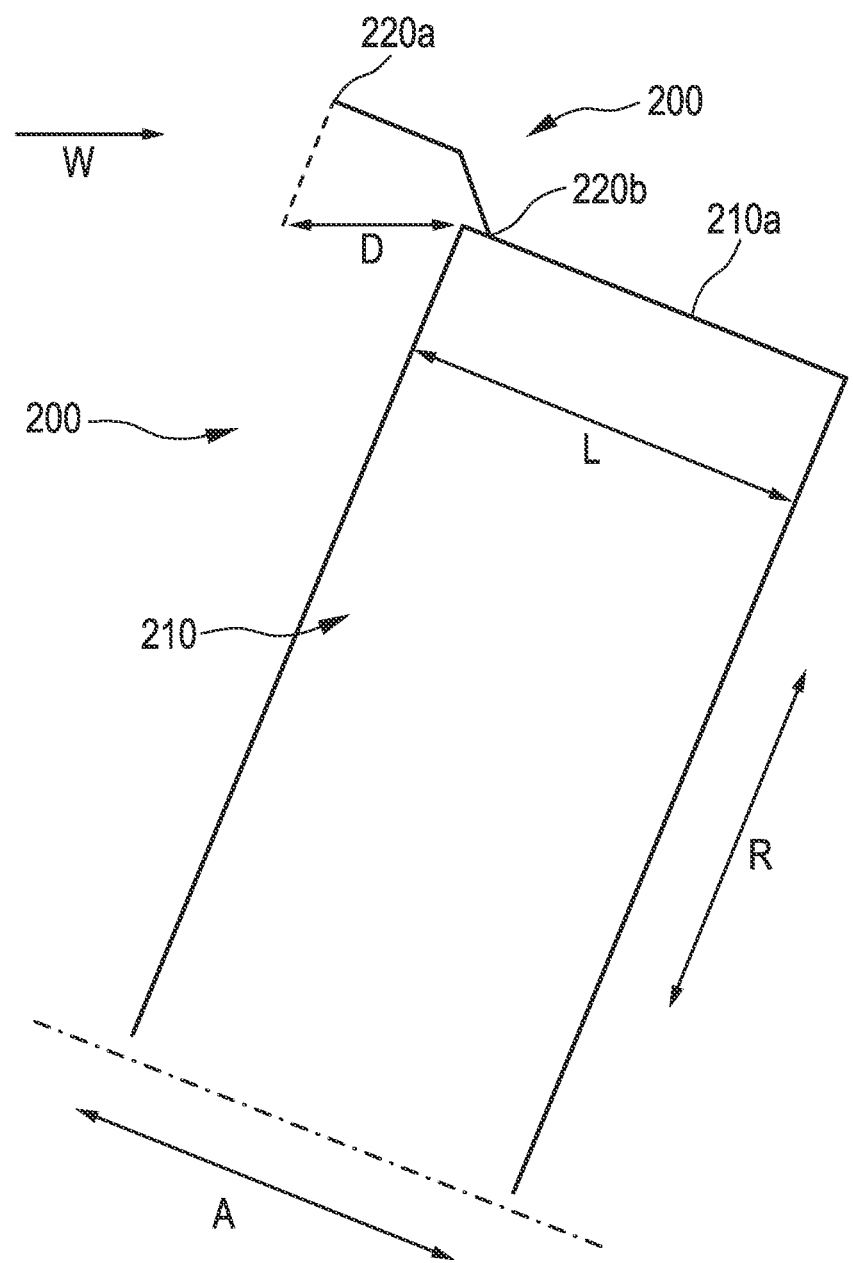
FIG. 13 shows a schematic side view of a generator with a further exemplary embodiment of an air cooling device.
Figure 14:
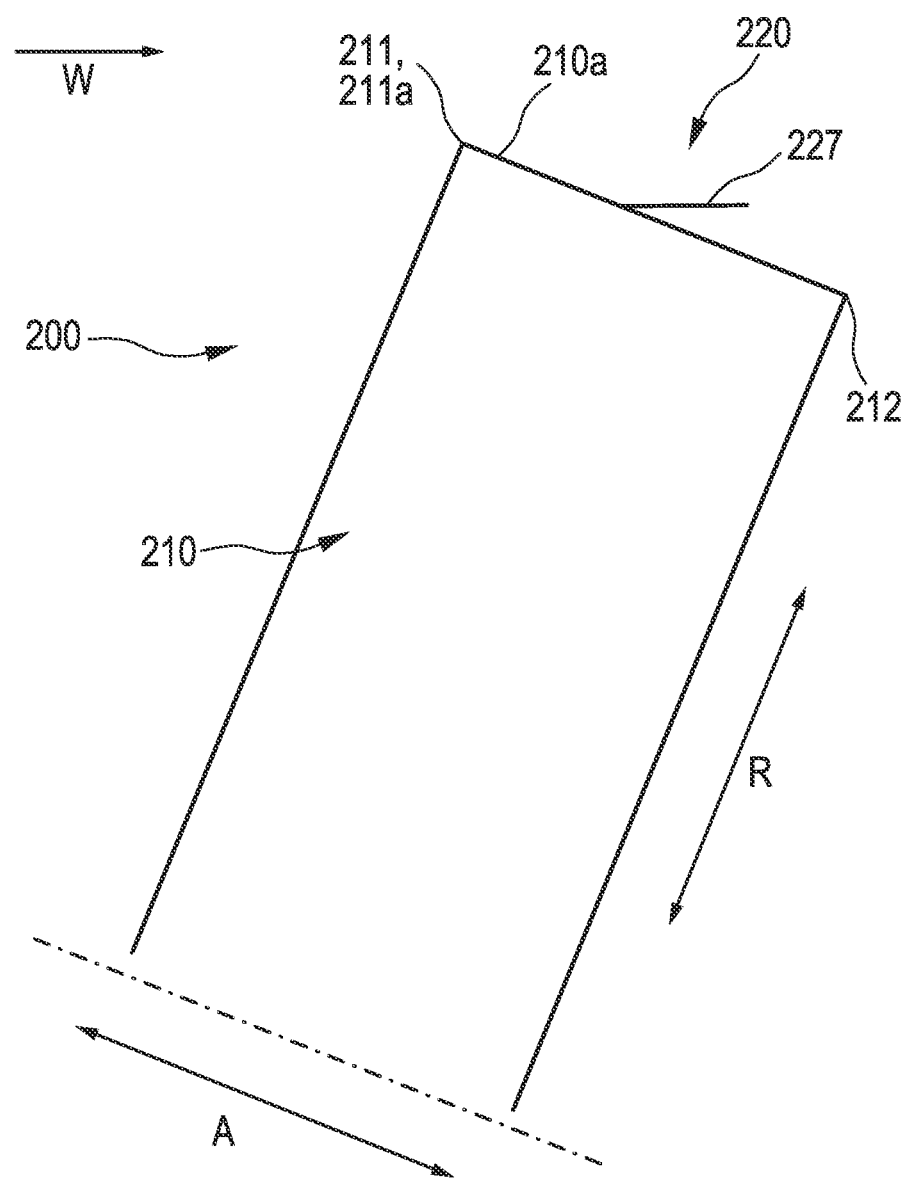
FIG. 14 shows a schematic side view of a generator with a further exemplary embodiment of an air cooling device.

FIGS. 13 and 14 show in each case a schematic side view of a generator with a further exemplary embodiment of an air cooling device 200.

FIG. 13 shows a preferred development of the air cooling device 200, in which in the operating state the air deflector 220 extends between an air deflection leading edge 220a and an air introduction edge 220b in the axial direction A, wherein the air deflection leading edge 220a is arranged upstream relative to the air introduction edge 220b relative to the wind W. In this preferred development, the cooling unit leading edge 211a is arranged between the air deflection leading edge 220a and the air introduction edge 220b in the axial direction A. The cooling unit leading edge 211a is thus arranged in the flow direction of the wind W downstream of the air deflection leading edge 220a and upstream of the air introduction edge 220b. In this case, it may be identified that starting from the cooling unit leading edge 211a the cooling unit outer surface 210a extends in the axial direction A between the first and second end 211, 212 of the cooling unit 210 with a cooling unit cooling length L. In this preferred embodiment the air deflector 220 is arranged such that the spacing D between the air deflection leading edge 220a and the cooling unit leading edge 211a corresponds to approximately a third of the cooling unit cooling length L.

FIG. 14 shows an embodiment of an air cooling device 200 with a fourth air deflection unit 227 which extends outwardly at an obtuse angle in the radial direction R starting from the cooling unit outer surface 227. In this case, the fourth air deflection unit 227 is arranged on the cooling unit outer surface 210a such that this fourth air deflection unit opens with the obtuse angle in the direction of the incident wind W. It may be identified that in this embodiment the fourth air deflection unit 227 is arranged on the cooling unit outer surface 210a such that this fourth air deflection unit and said cooling unit outer surface form an acute angle on the side facing away from the wind W.

LIST OF REFERENCE NUMERALS

100 Wind power installation
102 Tower
104 Nacelle
106 Rotor
108 Rotor blades
109 Hub
110 Spinner
200 Air cooling device
210 Cooling unit
210a Cooling unit outer surface
211 First end of cooling unit
211a Cooling unit leading edge
212 Second end of cooling unit
220 Air deflector
220a Air deflection leading edge
220b Air introduction edge
221 First air unit
222 Second air unit
223 Third air unit
224 Base element
225 Air deflection element
226 Flange
227 Fourth air unit
230 Damping unit
300 Air guiding device
310 Rotational unit
310a Rotational unit outer surface
320 Air guiding unit
A Axial direction
D Spacing between air deflection leading edge and cooling unit leading edge
K1 First converging air deflection channel
K2 Second converging air deflection channel
K3 Third converging air deflection channel
L Cooling unit cooling length
R Radial direction
U Peripheral direction
W Wind The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An air cooling device configured to air cool a generator of a wind power installation using wind, the air cooling device comprising:
a cooling unit of the generator having a cooling unit outer surface, the wind flowing onto the cooling unit outer surface for air cooling of the generator in an operating state of the wind power installation,
an air deflector arranged on the cooling unit, the air deflector extending outwardly in a radial direction starting from the cooling unit outer surface, and wherein the air deflector, in the operating state of the wind power installation, is configured to deflect the wind in the radial direction inwardly toward the cooling unit,
wherein the air deflector has a first air deflection unit which extends outwardly at an acute angle in the radial direction starting from the cooling unit outer surface and/or forms with the cooling unit a converging first air deflection channel, wherein the converging first air deflection channel is configured in an operating state of the wind power installation to deflect the wind for the air cooling in the radial direction inwardly in the direction of the cooling unit,
wherein the cooling unit extends in the axial direction between a first end, which in the operating state of the wind power installation is arranged upstream relative to the wind direction of the wind, and a second end, which in the operating state of the wind power installation is arranged upstream of the first end relative to the wind direction of the wind,
wherein the first air deflection unit is arranged in a first third and/or a first half of the cooling unit relative to the extension of the cooling unit starting from the first end in the axial direction,
a second air deflection unit arranged offset in the axial direction relative to the first air deflection unit and extending outwardly at an acute angle in the radial direction starting from the cooling unit outer surface and forming with the cooling unit a converging second air deflection channel which in the operating state of the wind power installation is configured to deflect the wind for the air cooling in the radial direction inwardly in the direction of the cooling unit, and
a third air deflection unit is arranged offset in the axial direction relative to the first and/or second air deflection unit and extending outwardly at an acute angle in the radial direction starting from the cooling unit outer surface and forming with the cooling unit a converging third air deflection channel which in the operating state of the wind power installation is configured to deflect the wind for the air cooling in the radial direction inwardly in the direction of the cooling unit, and wherein starting from the cooling unit outer surface, the first air deflection unit extends at a first acute angle, the second air deflection unit extends at a second acute angle, and the third air deflection unit extends at a third acute angle.

2. The air cooling device as claimed in claim 1, wherein: the cooling unit has a plurality of cooling ribs, the plurality of cooling ribs having a main extension in an axial direction and arranged spaced apart in a peripheral direction at right angles to the axial direction, and the air deflector has a main extension substantially in the peripheral direction.

3. The air cooling device as claimed in claim 1, wherein at least one deflection unit from the first, second, or third air deflection units comprises one or more partial ring segments.

4. The air cooling device as claimed in claim 1, wherein:
the first, second, and third acute angles are equal, or
the first acute angle is smaller than at least one of the second or third acute angles, or
the first acute angle is larger than at least one of the second or third acute angles, or
starting from the cooling unit outer surface, the first air deflection unit extends in the radial direction with a first height, the second air deflection unit extends in the radial direction with a second height, and the third air deflection unit extends in the radial direction with a third height, wherein:
the first, second, and third height are equal, or
the first height is smaller than at least one of the second or third heights, or
starting from the cooling unit outer surface, the first air deflection unit extends in the axial direction with a first length, the second air deflection unit extends in the axial direction with a second length, and the third air deflection unit extends in the axial direction with a third length, wherein:
the first, second, and third length are equal, or
the first length is smaller than at least one of the second or third lengths, or
the first length is larger than at least one of the second or third lengths.

5. The air cooling device as claimed in claim 1, wherein:
the second air deflection unit is arranged in a second or third and/or a second half of the cooling unit relative to the extension of the cooling unit starting from the first end in the axial direction, and/or
the third air deflection unit is arranged in a first, second or third and/or a first or second half of the cooling unit relative to the extension of the cooling unit starting from the first end in the axial direction.

6. The air cooling device as claimed in claim 1, wherein at least one of the first, second, or third air deflection units includes:
a base element configured for arranging the respective air deflection unit on the cooling unit, and/or
an air deflection element extending at an acute angle starting from the base element and forming, with the cooling unit, a converging air deflection channel, wherein the converging air deflection channel is configured in an operating state of the wind power installation to deflect the wind for the air cooling in the direction of the cooling unit, and/or
a flange extending at an angle starting from the base element and configured for connecting air deflection units arranged adjacently in the peripheral direction.

7. The air cooling device as claimed in claim 1, comprising a damping unit arranged between the air deflector and the cooling unit.

8. The air cooling device as claimed in claim 1, wherein in the operating state, the air deflector extends in an axial direction between an air deflection leading edge and an air introduction edge, wherein the air deflection leading edge is arranged upstream relative to the air introduction edge relative to the wind.

9. The air cooling device as claimed in claim 8, wherein the cooling unit outer surface has a cooling unit leading edge and the air deflector is arranged on the cooling unit such that the cooling unit leading edge is arranged in the axial direction between the air deflection leading edge and the air introduction edge.

10. The air cooling device as claimed in claim 9, wherein starting from the cooling unit leading edge, the cooling unit outer surface extends in the axial direction with a cooling unit cooling length, and wherein the spacing between the air deflection leading edge and the cooling unit leading edge is at least 0% of the cooling unit cooling length and a maximum of 100% of the cooling unit cooling length.

11. The air cooling device as claimed in claim 1, wherein the air deflector has a fourth air deflection unit extending outwardly at an obtuse angle in the radial direction starting from the cooling unit outer surface.

12. A generator of a wind power installation comprising the air cooling device as claimed in claim 1.

13. The generator of the wind power installation as claimed in claim 12, comprising:
an air guiding device for guiding wind to the cooling unit, the air guiding device comprising:
a rotational unit of an aerodynamic rotor of the wind power installation having a rotational unit outer surface, wind flowing along the rotational unit outer surface during an operation of the wind power installation,
wherein the rotational unit has connections for receiving rotor blades,
one or more air guiding units arranged on the rotational unit outer surface of the rotational unit between the connections, the one or more air guiding units extending outwardly in a radial direction starting from the rotational unit outer surface and being configured to deflect the wind to the cooling unit for air cooling of the generator, and
one or more covers over the one or more air guiding units.

14. The generator of the wind power installation as claimed in claim 13, wherein the rotational unit extends in an axial direction between a first end, which in an operating state of the wind power installation is arranged upstream relative to a wind direction of the wind, and a second end, which in the operating state of the wind power installation is arranged downstream of the first end relative to the wind direction of the wind, wherein the one or more air guiding units are arranged on the rotational unit such that the one or more air guiding units:
extend between the first and second end of the rotational unit, and/or
extend beyond the second end in the axial direction, and/or
extend outwardly at an inclination angle in the radial direction starting from the rotational unit outer surface.

15. A method comprising:
producing a generator of a wind power installation having the air cooling device as claimed in claim 1, the producing comprising:
arranging the air deflector on the cooling unit outer surface of the cooling unit, wherein the cooling unit has a plurality of cooling ribs having a main extension in an axial direction and arranged spaced apart in a peripheral direction at right angles to the axial direction, and wherein the air deflector has a main extension substantially in a peripheral direction, at right angles to the axial direction; and
fastening the air deflector to the cooling unit outer surface.

16. The method as claimed in claim 15, wherein the fastening the air deflector to the cooling unit outer surface comprises:
using at least one of a material connection, a welded connection, a non-positive connection, a screw connection, or a positive connection of the air deflector to the cooling unit, and/or
at least one of a material connection, a welded connection, a non-positive connection, a screw connection, and/or a positive connection of:
adjacently arranged partial ring segments to form the first air deflection unit which is configured as a ring, and/or
adjacently arranged partial ring segments to form the second air deflection unit which is configured as a ring, and/or
adjacently arranged partial ring segments to form the third air deflection unit which is configured as a ring, and/or
arranging a damping unit between the air deflector and the cooling unit.

17. The method as claimed in claim 15 comprising:
providing a rotational unit of an aerodynamic rotor of the wind power installation with a rotational unit outer surface, the wind flowing along the rotational unit outer surface during operation of the wind power installation,
arranging one or more air guiding units on the rotational unit outer surface of the rotational unit between the connections, and/or
fastening the rotational unit to the generator.

* * * * *